(12) United States Patent  
Matsumura et al.

(10) Patent No.: US 8,904,107 B2  
(45) Date of Patent: Dec. 2, 2014

(54) STORAGE APPARATUS AND PROGRAM UPDATE METHOD

(75) Inventors: Yusuke Matsumura, Odawara (JP); Tomohisa Ogasawara, Odawara (JP); Yukiyoshi Takamura, Kamakura (JP); Ryoma Ishizaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 13/497,689

(22) PCT Filed: Mar. 14, 2012

(86) PCT No.: PCT/JP2012/001774  
§ 371 (c)(1),  
(2), (4) Date: Mar. 22, 2012

(87) PCT Pub. No.: WO2013/136366  
PCT Pub. Date: Sep. 19, 2013

(65) Prior Publication Data  
US 2013/0246706 A1   Sep. 19, 2013

(51) Int. Cl.  
*G06F 12/00* (2006.01)

(52) U.S. Cl.  
USPC .......................................... 711/114; 711/103

(58) Field of Classification Search  
CPC ... G06F 12/00; G06F 21/50; G06F 2212/452; G06F 9/06  
USPC ................................................ 711/103, 114  
See application file for complete search history.

(56) References Cited

U.S. PATENT DOCUMENTS

2005/0188170 A1* 8/2005 Yamamoto .................... 711/170  
2011/0252195 A1 10/2011 Inoue et al.

FOREIGN PATENT DOCUMENTS

JP 2005-242555 A 9/2005

* cited by examiner

*Primary Examiner* — Jared Rutz  
*Assistant Examiner* — Christopher Do  
(74) *Attorney, Agent, or Firm* — Foley & Lardner LLP

(57) ABSTRACT

A storage apparatus and program update method for reducing tediousness and complications of drive inventory management.

A storage apparatus 10 includes a disk unit 400 composed of a plurality of first drives 420 storing first firmware of the same type, a controller 100 for controlling data during operation of the first firmware, a relay device 300, and a second drive 520. Then, the second drive 520 stores second firmware of the same type as that of the first firmware and third firmware of a type different from that of the first firmware. The controller 100 includes: a firmware comparison unit for comparing the first firmware with the second firmware; a firmware comparison unit for deciding firmware to operate on the storage apparatus 10 based on the comparison result; and a firmware update unit for updating the firmware operating on the first drive 420 or the second drive 520 with the decided firmware.

14 Claims, 22 Drawing Sheets

FIG. 3

| RAID GROUP | POSITION (C/R) | DRIVE TYPE | FW OPERATION MODE | FW REVISION | LU | | | | | | |
|---|---|---|---|---|---|---|---|---|---|---|---|
| RAID01 | 00/00 | DRIVE a | NORMAL | aA102 | - | - | - | - | - | - | - |
| RAID01 | 01/00 | DRIVE a | NORMAL | aA102 | - | - | - | - | - | - | - |
| RAID01 | 04/00 | DRIVE a | NORMAL | aA102 | - | - | - | LU4 | - | - | - |
| RAID01 | 05/00 | DRIVE b | FOR ENERGY SAVING | bA203 | - | - | - | - | - | - | - |
| RAID02 | 02/03 | DRIVE b | NORMAL | bA102 | - | - | LU3 | - | - | - | - |
| RAID02 | 03/03 | DRIVE c | FOR LOW PERFORMANCE | cA305 | - | - | - | - | LU5 | - | - |
| RAID02 | 06/03 | DRIVE c | FOR LOW PERFORMANCE | cA305 | - | - | - | - | - | LU6 | LU7 |
| RAID02 | 07/03 | DRIVE a | NORMAL | aA102 | - | - | - | - | - | - | - |
| RAID03 | 00/05 | DRIVE c | ENCRYPTION | cA401 | LU1 | LU2 | - | - | - | - | - |
| RAID03 | 01/05 | DRIVE c | ENCRYPTION | cA401 | - | - | - | - | - | - | - |
| RAID03 | 04/05 | DRIVE c | ENCRYPTION | cA401 | - | - | - | - | - | LU8 | - |
| RAID03 | 05/05 | DRIVE c | ENCRYPTION | cA401 | - | - | - | - | - | - | LU9 |
| 71A | 71B | 71C | 71D | 71E | 71F | | | | | | |

FIG.9

FOR TYPE A STORAGE APPARATUS

MICROPROGRAM (FOR A)  — 5231A

VERSION:A1.1
STORAGE LOCATION(A11)

VERSION:A1.2
STORAGE LOCATION(A12)

VERSION:A2.1
STORAGE LOCATION(A21)

VERSION:A2.2
STORAGE LOCATION(A22)

FW (FOR A)  — 5231B

DRIVE a
REVISION:aA101
 STORAGE LOCATION(aA101)
REVISION:aA102
 STORAGE LOCATION(aA102)
REVISION:aA201
 STORAGE LOCATION(aA201)
REVISION:aA203
 STORAGE LOCATION(aA203)

DRIVE b
REVISION:bA101
 STORAGE LOCATION(bA101)
REVISION:bA102
 STORAGE LOCATION(bA102)
REVISION:bA201
 STORAGE LOCATION(bA201)
REVISION:bA203
 STORAGE LOCATION(bA203)

FOR TYPE B STORAGE APPARATUS

MICROPROGRAM (FOR B)  — 5231C

VERSION:B1.1
STORAGE LOCATION(B11)

VERSION:B1.2
STORAGE LOCATION(B12)

VERSION:B2.1
STORAGE LOCATION(B21)

VERSION:B2.2
STORAGE LOCATION(B22)

FW (FOR B)  — 5231D

DRIVE a
REVISION:aB101
 STORAGE LOCATION(aB101)
REVISION:aB102
 STORAGE LOCATION(aB102)
REVISION:aB201
 STORAGE LOCATION(aB201)
REVISION:aB203
 STORAGE LOCATION(aB203)

DRIVE b
REVISION:bB101
 STORAGE LOCATION(bB101)
REVISION:bB102
 STORAGE LOCATION(bB102)
REVISION:bB201
 STORAGE LOCATION(bB201)
REVISION:bB203
 STORAGE LOCATION(bB203)

| DRIVE TYPE NAME (GENERATION) | PERFORMANCE GROUP |
|---|---|
| DRIVE a | 1 |
| DRIVE b | |
| DRIVE c | 2 |
| DRIVE d | |
| DRIVE e | |
| DRIVE f | 3 |
| DRIVE g | 4 |
| DRIVE h | |

72A  72B  72

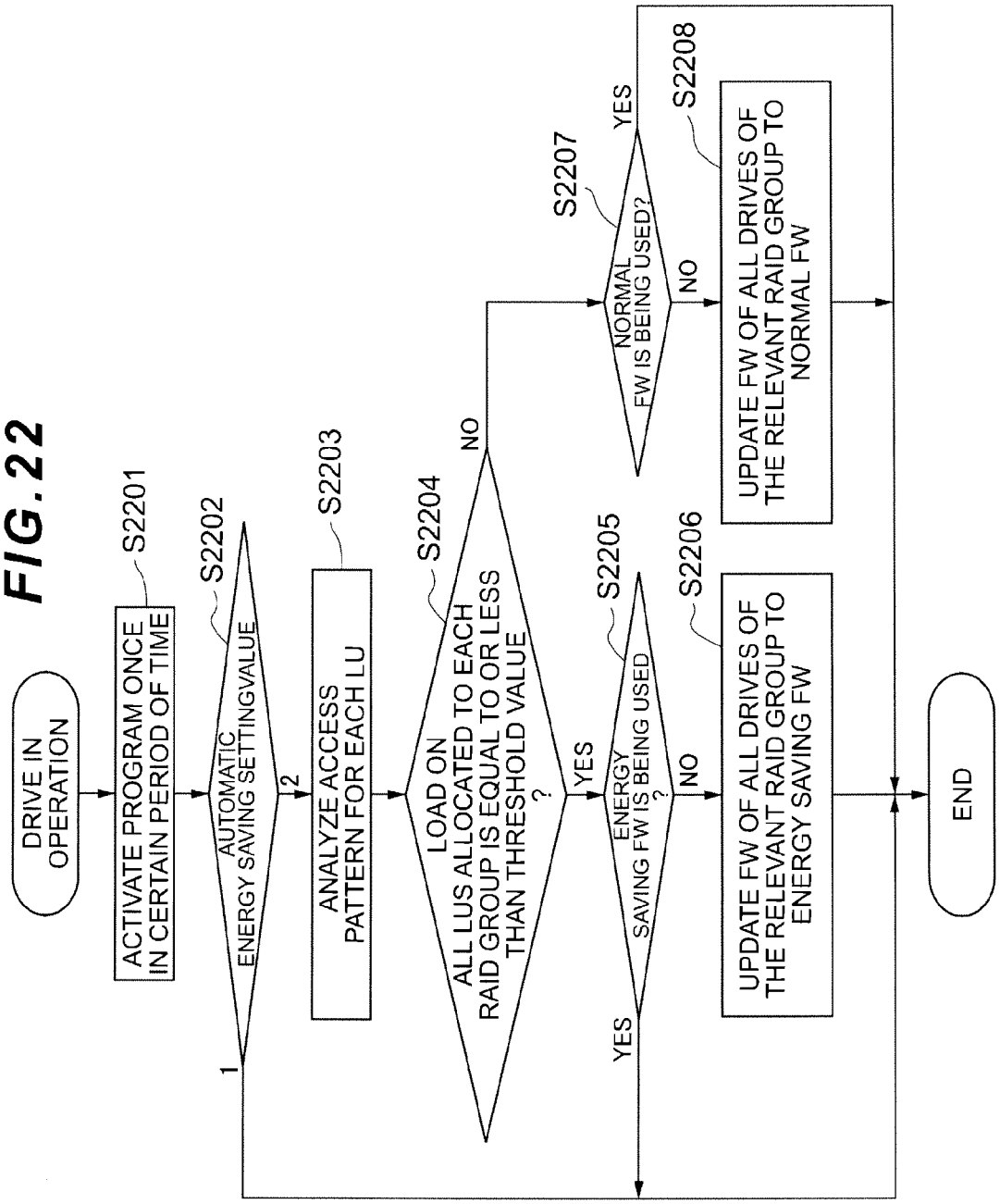

STORAGE APPARATUS AND PROGRAM UPDATE METHOD

TECHNICAL FIELD

The present invention relates to a storage apparatus and a program update method and is suited for use in a backbone storage system that controls a disk unit composed of a plurality of storage devices and deals with large-capacity data.

BACKGROUND ART

Conventionally, the backbone storage system which deals with large-capacity data manages data by using a storage apparatus configured separately from a host terminal. With the storage apparatus, for example, many storage devices (drives) such as hard disk drives (HDD) are arranged in arrays. With the disk unit, a plurality of drives constitute one virtual drive and one or more virtual drives constitute a RAID (Redundant Array of Independent Inexpensive Disks) group.

Generally, a drive is equipped with necessary firmware to control hardware in the drive. Then, if a new drive is loaded into the storage apparatus, there is a suggested technique to update firmware operating in the storage apparatus to firmware stored in the new drive.

For example, PTL 1 discloses a storage control system for reading new-version firmware from a newly mounted drive into a cache area of a cache memory and updating old-version firmware of one or more drives selected from a plurality of drives, which were mounted before the new drive and are in operation, to the new-version firmware which has been read.

Furthermore, PTL 2 discloses a storage system for adjusting signal quality of an HDD transmitter-receiver according to a device type of a loaded drive and a loaded position of the drive based on information, which is written to the drive in advance, to obtain optimum quality.

CITATION LIST

Patent Literature

PTL 1: Japanese Patent Application Laid-Open (Kokai) Publication No. 2005-242555 (US 2005/0188170 A1)
PTL 2: US 2011/0252195 A1

SUMMARY OF INVENTION

Technical Problem

Meanwhile, a drive is operated by firmware corresponding to a storage apparatus where the drive is loaded; however, the type of firmware used in storage apparatuses may differ from one storage apparatus to another.

However, if a drive which stores firmware of a different version is loaded into the storage apparatus according to the techniques disclosed to PTL 1 and PTL 2, firmware of the storage apparatus, where the drive is loaded, can be updated to firmware of a new version, but another storage apparatus operated by firmware of a type different from that of the above-mentioned storage apparatus cannot be loaded with the above-mentioned drive.

Therefore, regarding a drive product that may possibly be loaded into a storage apparatus operated by firmware of a different type, even the same product requires a plurality of types of drives for storing firmware to deal with storage apparatuses in order to secure enough products and maintenance products in stock. As a result, the resulting problem is that cost increases due to an increase of the inventory and complications of management.

The present invention was devised in consideration of the above-described circumstances and provides a storage apparatus and program update method for reducing tediousness and complications of drive inventory management.

Solution to Problem

In order to solve the above-described problem, a storage apparatus including a disk unit composed of a plurality of first drives storing first firmware of the same type, a controller for controlling data during operation of the first firmware, a relay device connecting the controller and the disk unit, and a second drive storing a plurality of programs is provided according to the present invention, wherein the second drive stores second firmware of the same type as that of the first firmware and third firmware of a type different from that of the first firmware; and wherein the controller includes: a firmware comparison unit for comparing the first firmware with the second firmware; a firmware decision unit for deciding firmware between the first firmware and the second firmware to operate on the storage apparatus based on the comparison result by the firmware comparison unit; and a firmware update unit for updating the firmware operating on the first drive or the firmware operating on the second drive with the firmware decided by the firmware decision unit.

Furthermore, a program update method for a storage apparatus including a disk unit composed of a plurality of first drives storing first firmware of the same type, a controller for controlling data during operation of the first firmware, a relay device connecting the controller and the disk unit, and a second drive storing a plurality of programs is provided according to the present invention, wherein the second drive stores second firmware of the same type as that of the first firmware and third firmware of a type different from that of the first firmware; and wherein the controller: compares the first firmware with the second firmware; decides firmware between the first firmware and the second firmware to operate on the storage apparatus based on the firmware comparison result; and updates the firmware operating on the first drive or the firmware operating on the second drive with the decided firmware.

Furthermore, a storage apparatus having a disk unit composed of a plurality of drives according to the present invention is equipped with one drive that can be loaded into different types of storage apparatuses.

Advantageous Effects of Invention

According to the present invention, the tediousness and complications of drive inventory management can be reduced.

BRIEF DESCRIPTION OF DRAWINGS

FIG. 3 is an explanatory diagram showing an example of a drive management table.

FIG. 9 is an explanatory diagram showing an example of a management table for the new drive.

FIG. 18 is an explanatory diagram showing an example of performance groups corresponding to drive types.

FIG. 22 is a flowchart illustrating firmware switching processing by a storage apparatus according to a sixth embodiment.

DESCRIPTION OF EMBODIMENTS

(1) First Embodiment

(1-1) Configuration of Storage System According to this Embodiment

Figure 1:
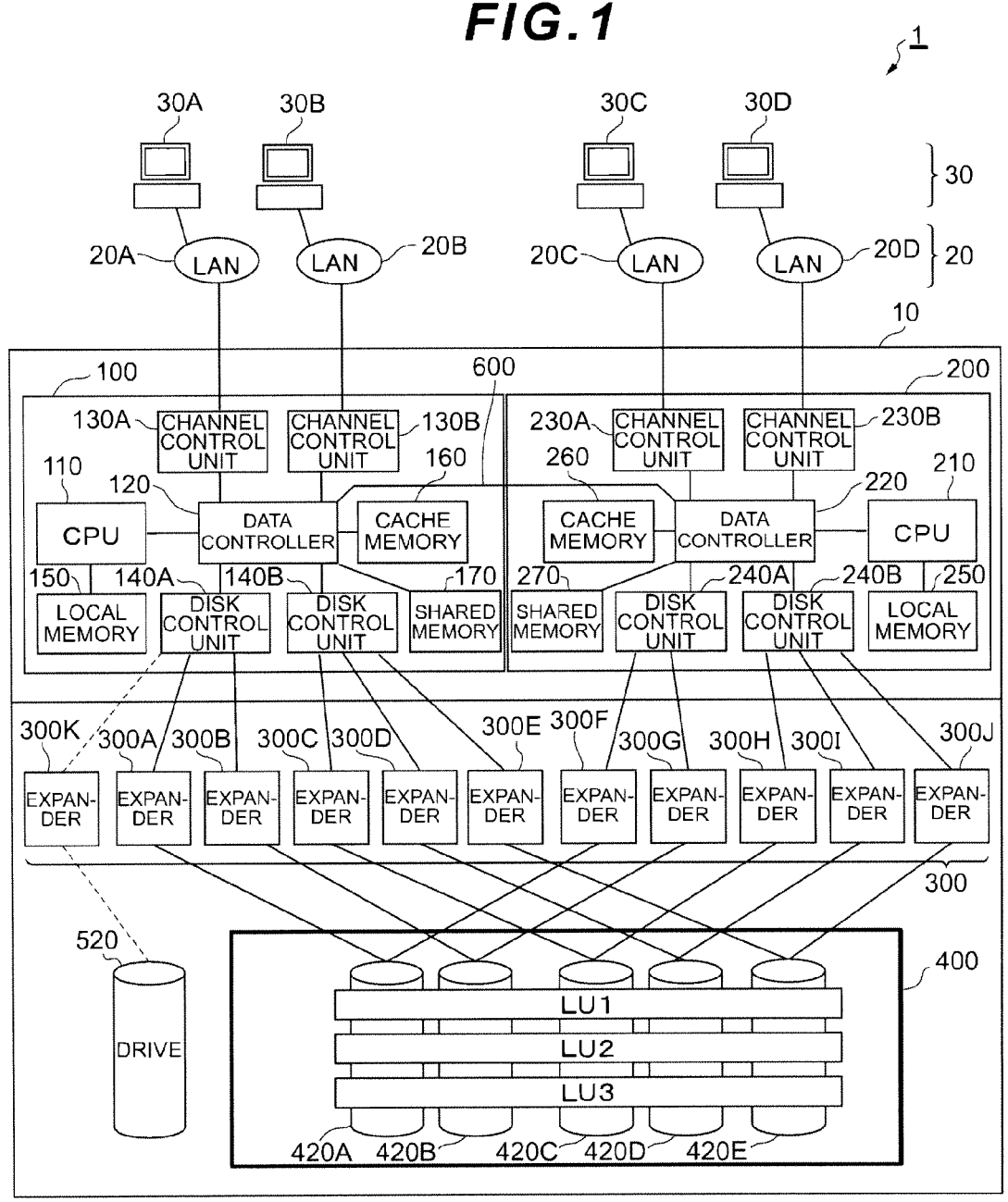
FIG. 1 is a block diagram showing the configuration of a storage apparatus according to a first embodiment.

Referring to FIG. 1, the reference numeral 1 represents a computer system according to a first embodiment as a whole. This computer system 1 includes nodes such as a plurality of host terminals 30 (individually, host terminals 30A to 30D) and a storage apparatus 10; and the computer system 1 is configured so that the plurality of host terminals 30 and the storage apparatus 10 are connected via LANs (Local Area Networks) 20 (individually, LANs 20A to 20D).

The host terminal 30 is composed of, for example, a computer device such as a personal computer, workstation, or mainframe and is equipped with information resources (not shown in the drawing) such as a CPU (Central Processing Unit), a memory, and a CNA (Converged Network Adapter) and the respective resources are connected via a system bus (not shown in the drawing).

The CPU (not shown in the drawing) of the host terminal 30 is a processor for controlling the operation of the host terminal 30. Furthermore, the memory (not shown in the drawing) is composed of, for example, a volatile or nonvolatile memory such as a DDR SDRAM (Double-Date-Rate Synchronous Dynamic Random Access Memory) and is used to retain programs and data and is also used as a work memory for the CPU. Various processing is executed as the host terminal 30 by the CPU executing the programs stored in the memory. Incidentally, the host terminal 30 is positioned as a host terminal that issues instructions to, for example, read data from, or write data to, the storage apparatus 10.

(1-1-1) Configuration of Storage Apparatus

The storage apparatus 10 is configured by including a plurality of first drives 420 (individually, drives 420A to 420E), a second drive 520, a system-0 controller 100 and system-1 controller 200 for controlling data input to, or output from, the plurality of drives 420, 520, and a plurality of expanders 300 (individually, expanders 300A to 300K) connecting the drives 420, 520 and the controllers 100, 200.

The first and second drives 420, 520 are composed of expensive storage devices such as SSD (Solid State Drive) or SAS (Serial Attached SCSI) disks or inexpensive storage disks such as SATA (Serial ATA) disks. The first drives 420 are operated by each system-0 controller 100 or system-1 controller 200 according to a RAID (Redundant Array of Independent Inexpensive Disks) system. One or more first drives 420 are managed as one parity group (RAID group) and one or more logical volumes (hereinafter referred to as the logical unit(s) [LU(s): Logical Unit(s)]) are set in a physical storage area provided by each first drive 420 constituting one parity group. Data is stored in units of blocks, each of which is of a specified size (hereinafter referred to as the logical block(s)) in this logical unit. Each logical unit is assigned its unique identifier (hereinafter referred to as the LUN [Logical Unit Number]).

With the storage apparatus 10, such a plurality of first drives 420 are mounted in the disk unit 400. The disk unit 400 is, for example, a disk array apparatus in which the plurality of first drives 420 are arranged in arrays.

Figure 2:
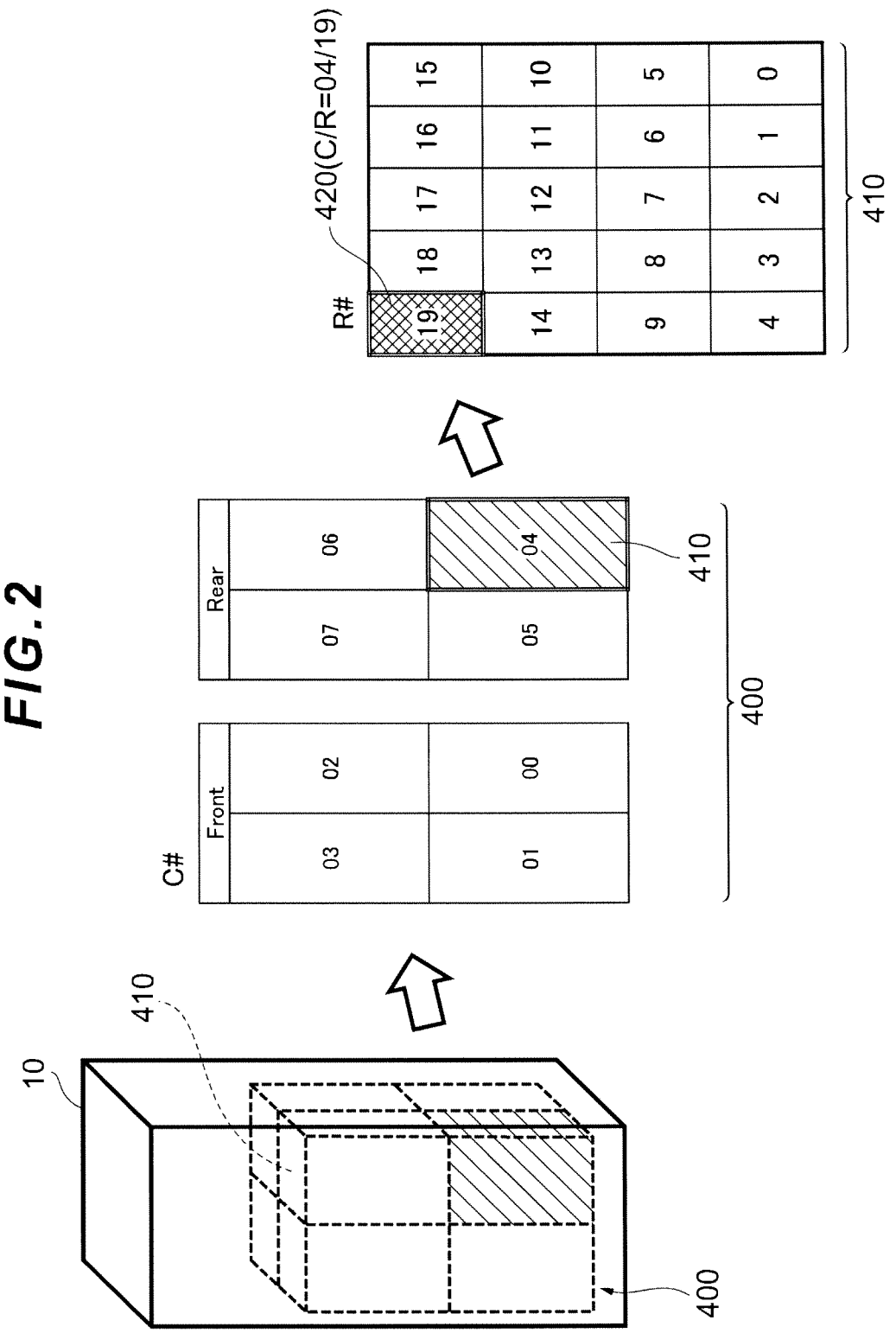
FIG. 2 is a diagrammatic illustration for explaining a drive loading example in a disk unit.

FIG. 2 shows a loading example of the first drives 420 in the disk unit 400. Referring to FIG. 2, the disk unit 400 is composed of eight unit drive units 410. The unit drive unit 410 may be configured so that each unit 410 can be attached to or detached from the disk unit 400. Each unit drive unit 410 is indicated as (C=00 to 07) according to its arranged position. For example, the position of a unit drive unit 410 marked with diagonal lines is indicated as (C=04). Then, each unit drive unit 410 is loaded with twenty first drives 420. Each first drive 420 is indicated as (R=0 to 19) according to its arranged position. For example, the position of a first drive 420 marked with cross-hatched lines in FIG. 2 is indicated as (C/R=04/19).

Incidentally, the second drive 520 is one of characteristic configurations of the storage apparatus 10 according to this embodiment and will be explained in detail in section (1-2-2).

(1-1-2) Configuration of Controller in Storage Apparatus

Each system-0 controller 100 or system-1 controller 200 is configured by including a CPU 110, 210, a data controller 120, 220, channel control units 130A, 130B, 230A, 230B, disk control units 140A, 140B, 240A, 240B, a local memory 150, 250, a cache memory 160, 260, and a shared memory 170, 270.

Now, the configuration of the system-1 controller 200 is the same as that of the system-0 controller 100 and its operation is also the same as that of the system-0 controller 100, except that one is an online system and the other is a standby system. Therefore, the system-0 controller 100 will be explained below and an explanation of the system-1 controller 200 has been omitted.

Each channel control unit 130A, 130B is an interface with the LAN 20 and has one or more ports. Then, the channel control units 130A, 130B are connected via their ports to the LANs 20A, 20B, respectively; and send or receive, for example, various commands and write data or read data via the connected LANs 20A, 20B to or from the host terminals 30A, 30B.

The CPU 110 is a processor for controlling data input/output processing on the storage devices 420 in response to write commands and read commands from the host terminals 30 and controls the channel control units 130A, 130B, the data controller 120, and the disk control units 140A, 140B based on microprograms read from the first and second drives 420, 520.

The data controller 120 has a function switching a data transfer source and a transfer destination between the channel control units 130A, 130B, the cache memory 160, and the disk control units 140A, 140B and a function, for example, generating/adding/verifying/deleting parity, check codes, and so on and is composed of, for example, an ASIC (Application Specific Integrated Circuit).

Furthermore, the system-0 data controller 120 is connected to the data controller 220 of the other system (system 1) via a bus 600, so that data and commands can be sent and received via this bus 600 between the system-0 data controller 120 and the system-1 data controller 220.

The local memory 150 is used as a work memory for the CPU 110 and the data controller 120. For example, the local memory 150 stores a microprogram read from a specified drive 420 at the time of activation of the storage apparatus 10 and is operated under control of the data controller 120. Furthermore, the local memory 150 stores various system information.

The cache memory 160 is used to temporarily store data transferred between the channel control units 130A, 130B and the disk control units 140A, 140B. The shared memory 170 is used to store configuration information of the storage apparatus 10. For example, a drive management table 71 (which will be explained later in detail) is stored in the shared memory 170.

Each disk control unit 140A, 140B is an interface with the first and second drives 420, 520. This disk control unit 140A, 140B controls the corresponding first and second drives 420, 520 via the expanders 300 in response to a write command or read command from the host terminal 30, which is issued from the channel control unit 130A, 130B. Specifically speaking, the disk control unit 140A, 140B writes write data to an address position in a logical unit designated by the write command and reads read data from an address position in a logical unit designated by the read command.

The expanders 300 are provided so that they correspond to the system-0 controller 100 and the system-1 controller 200, respectively; and each expander 300A to 300K is connected to the disk control unit 140A, 140B, 240A, 240B of the corresponding system-0 controller 100 or system-1 controller 200. On the other hand, the expanders 300 are connected to the first and second drives 420, 520, so that they transfer various commands and write target data, which have been output from the disk control units 140A, 140B, 240A, 240B of the controllers 100, 200, to its transmission destination, that is, the first and second drives 420, 520 and send read data and status information, which have been output from the first and second drives 420, 520, to the disk control units 140A, 140B, 240A, 240B.

(1-2) Characteristic Configuration and Function of Storage Apparatus According to this Embodiment The storage apparatus 10 according to the first embodiment is characterized in that a microprogram for the storage apparatus (hereinafter referred to as the microprogram) and drive firmware (hereinafter referred to as the firmware) are updated on the second drive 520 side and the storage apparatus 10 side as triggered by connection of a second drive 520, which is a new drive to the storage apparatus 10 in which the plurality of first drives 420 are mounted.

With the storage apparatus 10, the controller 100 and the disk unit 400 control data to store large-capacity data. Specifically speaking, the data controller 120 executes a microprogram, which is of a type compatible with the storage apparatus 10, in the local memory 150. In the following explanation, the microprogram executed in this local memory 150 may be sometimes referred to as the microprogram in operation on the storage apparatus 10. Then, the data controller 120 reads firmware of the same type as that of the microprogram in operation from the first drive 420 and executes it in the local memory 150, thereby storing/fetching data in/from the plurality of first drives 420 in the disk unit 400. In the following explanation, the firmware executed in this local memory 150 may be sometimes referred to as the firmware in operation on the storage apparatus 10. Incidentally, the microprogram and the firmware may be executed in an internal memory (not shown in the drawing) in the data controller 120.

Now, for example, with the storage apparatus 10 shown in FIG. 1, it is assumed that a microprogram for A and firmware for A, which operate on a storage apparatus of "type A," are capable of operation. Then, a storage apparatus of "type B" (not shown in the drawing) is assumed to be a storage apparatus of a type different from that of the storage apparatus 10. With the "type B" storage apparatus, a microprogram for B and firmware for B are capable of operation.

Furthermore, the shared memory 170 of the controller 100 stores a drive management table 71 showing information of which first drive 420 is loaded with which firmware or into which logical unit the relevant RAID group is divided, with respect to each of the first drives 420A to 420E.

FIG. 3 is an example of the drive management table 71. The drive management table 71 shown in FIG. 3 includes, with respect to each first drive 420 mounted in the storage apparatus 10, the following columns of a RAID group 71A, a position 71B, a drive type 71C, a firmware operation mode (FW operation mode) 71D, a firmware revision (FW revision) 71E, and a logical unit (LU) 71F.

The RAID group 71A indicates a RAID group, to which the relevant drive 420 belongs, as RAID01 to RAID04. The position 71B indicates the position where the relevant drive 420 is stored, and is indicated by the position indication method (C/R) explained with reference to FIG. 2. The drive type 71C indicates the type of the relevant drive 420. The firmware operation mode 71D indicates an operation mode of the firmware requested for the drive 420. For example, each of the following modes is indicated: "Normal" which represents a normal mode; "For Energy Saving" which represents an energy saving mode; "For Low Performance" which represents a low performance mode by, for example, curbing the number of rotations of the relevant drive 420; and "Encryption" which represents a mode to encrypt data. The firmware revision 71E indicates a revision of the firmware operating on the drive 420. Now, the revision name of the firmware is decided in accordance with a specified naming convention. For example, regarding a firmware revision "aA102" operating on the drive C/R=00/00 shown in FIG. 3, "a" represents the drive type, "A" represents the target storage apparatus, "1" represents the operation mode of the firmware, and "02" represents the revision of the operation mode. The logical unit 71F indicates the types of logical units allocated for each RAID group 71A. For example, logical units LU4, LU6, LU7 are allocated to RAID01.

This drive management table 71 can be used, for example, when deciding the firmware to be updated on a RAID group basis, but not updating the firmware uniformly in the storage apparatus. Specific usage will be explained in a second embodiment explained later.

(1-2-1) Characteristic Configuration of First Drive

Next, a logical configuration of the first drive 420 and a table and programs stored in the first drive 420 will be explained.

Figure 4:
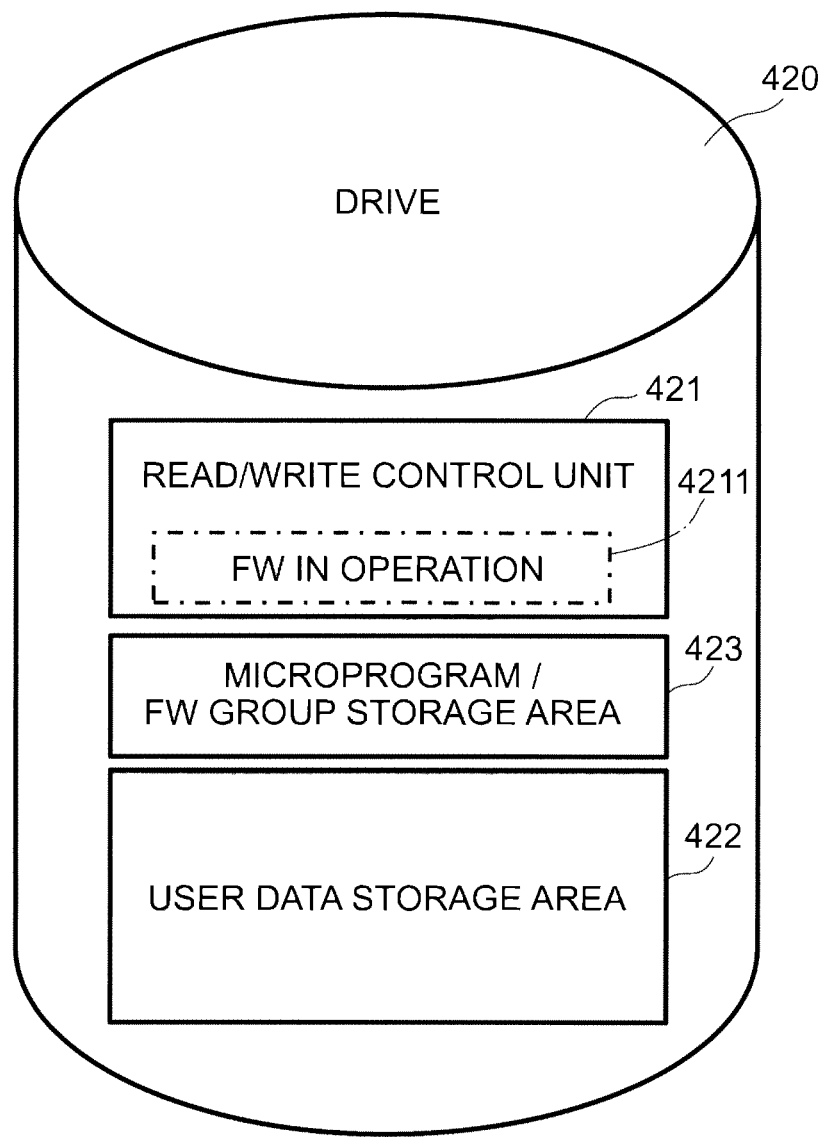
FIG. 4 is a block diagram showing a logical configuration of a drive on the storage apparatus side.

FIG. 4 shows the logical configuration of the first drive 420. The first drive 420 includes a read/write control unit 421, a user data storage area 422, and a microprogram/firmware group storage area 423.

The read/write control unit 421 controls each element in the first drive 420. For example, the read/write control unit 421 controls reading and writing of data stored in the user data storage area 422 and the microprogram/firmware group storage area 423. Furthermore, the read/write control unit 421 executes the firmware read from the microprogram/firmware group storage area 423 (the firmware 4211 in operation). The user data storage area 422 is a storage area for storing user data for which a request is issued by the host terminal 30 to store the data in the storage apparatus 10.

Figure 5:
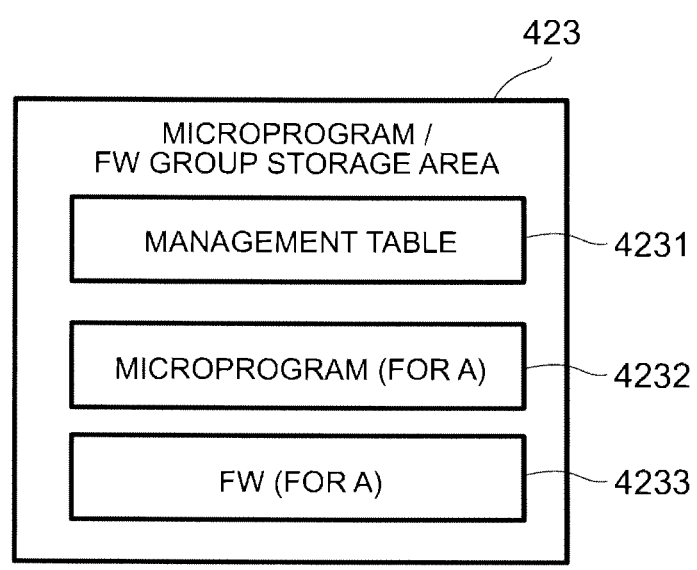
FIG. 5 is a block diagram showing a logical configuration of a microprogram/firmware group storage area of the drive on the storage apparatus side.

FIG. 5 is an example of data stored in the microprogram/firmware group storage area 423. The microprogram/firmware group storage area 423 stores a microprogram (microprogram for A) 4232, firmware (firmware for A) 4233, and a management table 4231 for managing them. For example, the microprogram 4232 may be a plurality of microprograms of the same type (for A) and different versions and the firmware 4233 may be firmware of the same type (for A) and different revisions.

Figure 6:
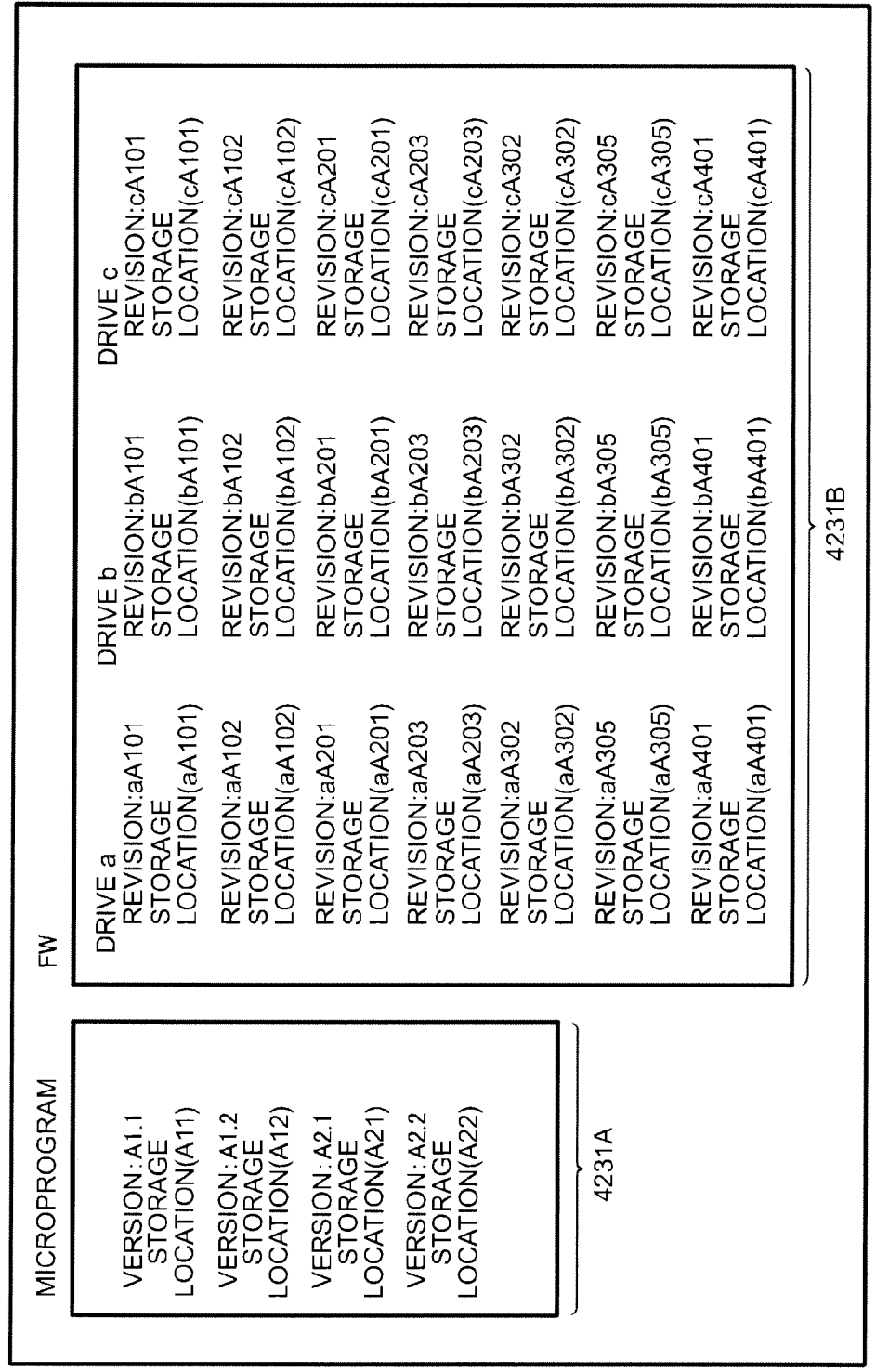
FIG. 6 is an explanatory diagram showing an example of a management table for the drives on the storage apparatus side.

FIG. 6 is a management table 4231 stored in the microprogram/firmware group storage area 423 of the first drive 420A. The management table 4231 includes, with respect to a target first drive 420, a microprogram column 4231A indicating information about its microprogram 4232 and a firmware column 4231B indicating information about its firmware 4233.

Specifically speaking, the microprogram column 4231A includes descriptions about the type of a matching storage apparatus, versions, and storage locations with respect to the microprogram 4232. For example, according to information on the top row of the microprogram column 4231A in FIG. 6, you can see that the microprogram of version 1.1 capable of operating on the type A storage apparatus is stored in a storage position indicated as A11. Furthermore, the firmware column 4231B includes descriptions about the type of a matching drive, and the type of a matching storage apparatus, revisions, and storage locations with respect to the firmware 4233. For example, according to information on the top row of the left column in the firmware column 4231B in FIG. 6, you can see that the firmware of a revision aA101 capable of operating on the drive of the drive type a for the type A storage apparatus is stored at a storage location indicated as aA101.

In the following explanation, notation such as XVs may be sometimes used to express a version of the microprogram described in the management table 4231. Regarding such notation, "X" is a variable number and represents the type of a storage apparatus with which the relevant microprogram is compatible; "V" indicates that it is a version of the microprogram; and "s" indicates that the relevant microprogram operates on the storage apparatus side (already mounted in the storage apparatus).

Furthermore, notation such as xXFs may be sometimes used to express a revision of the firmware described in the management table 4231. Regarding such notation, "x" is a variable number and represents the drive type with which the relevant firmware is compatible; "X" is a variable number and represents the type of a storage apparatus with which the relevant firmware is compatible; "F" indicates that it is a revision of the firmware; and "s" indicates that the relevant firmware operates on the storage apparatus side.

(1-2-2) Characteristic Configuration of Second Drive

Next, a logical configuration of the second drive 520 and a table and programs stored in the second drive 520 will be explained.

The second drive 520 is a storage device represented by, for example, a hard disk drive. The second drive 520 shown in FIG. 1 is connected via the expander 300 to the disk control unit 140 of the controller 100 (in the following explanation, a description reciting "the second drive 520 is loaded into the storage apparatus 10" may be sometimes used).

Figure 7:
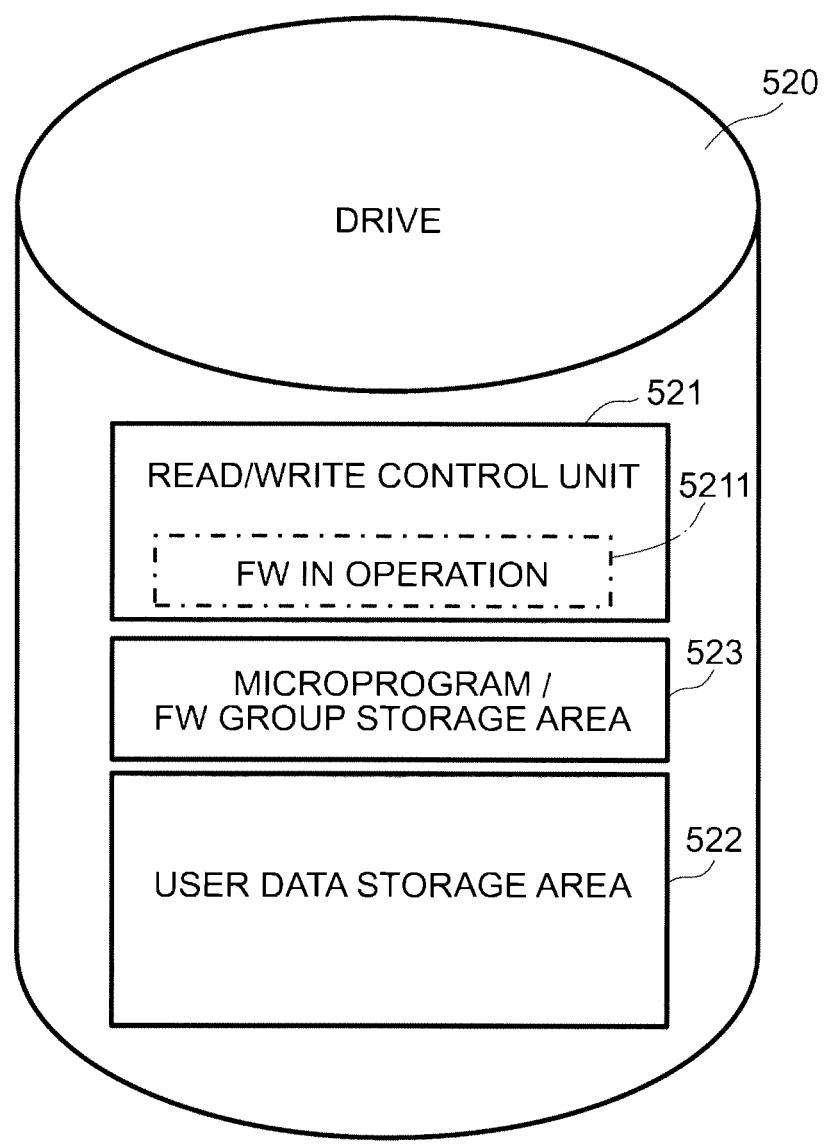
FIG. 7 is a block diagram showing a logical configuration of a new drive.

FIG. 7 shows the logical configuration of the second drive 520. The second drive 520 includes a read/write control unit 521, a user data storage area 522 for storing user data, and a microprogram/firmware group storage area 523.

The read/write control unit 521 controls each element in the second drive 520. For example, the read/write control unit 521 controls reading and writing of data stored in the user data storage area 522 and the microprogram/firmware group storage area 523. Furthermore, the read/write control unit 521 executes the firmware read from the microprogram/firmware group storage area 523 (the firmware 5211 in operation).

Figure 8:
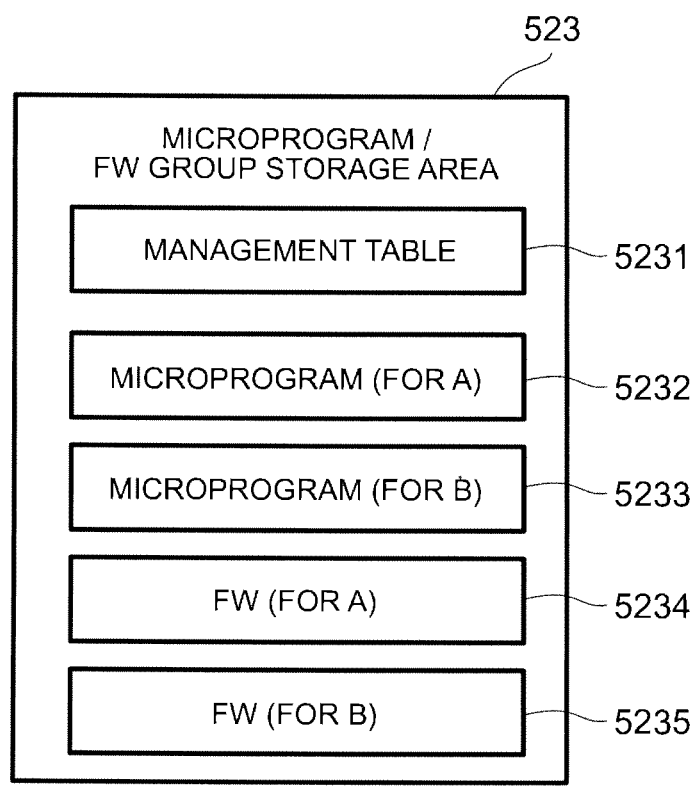
FIG. 8 is a block diagram showing a logical configuration of a microprogram/firmware group storage area of the new drive.

FIG. 8 is an example of data stored in the microprogram/firmware group storage area 523. The microprogram/firmware group storage area 523 stores a microprogram 5232 for A, a microprogram 5233 for B, firmware 5234 for A, firmware 5235 for B, and a management table 5231 for managing them. Specifically speaking, the second drive 520 stores the microprograms and firmware that can operate on type A and type B, respectively. It should be noted that type A and type B are examples and the second drive 520 may store microprograms and firmware that are compatible with two or more types, respectively.

Incidentally, the microprogram 5232 for A may be a plurality of microprograms of the same type (for A) and different versions and the microprogram 5233 for B may be a plurality of microprograms of the same type (for B) and different versions. Furthermore, the firmware 5234 for A may be a plurality of pieces of firmware of the same type (for A) and different revisions and the firmware 5235 for B may be a plurality of pieces of firmware of the same type (for B) and different revisions.

FIG. 9 is a management table 5231 stored in the microprogram/firmware group storage area 523 of the second drive 520. The management table 5231 describes information about the microprograms and firmware stored in the microprogram/firmware group storage area 523 of the second drive 520 and the information is classified by compatible storage apparatus types (such as type A and type B).

For example, in a case of the microprogram/firmware group storage area 523 shown in FIG. 8, microprograms and firmware that are compatible with the type A storage apparatus 10 and the type B storage apparatus (not shown in the drawing) are stored, respectively. So, the management table 5231 includes a microprogram column 5231A for the type A storage apparatus, a firmware column 5231B for the type A storage apparatus, a microprogram column 5231C for the type B storage apparatus, and a firmware column 5231D for the type B storage apparatus. The respective columns 5231A to 5231D describe the same items as those in the management table 4231 shown in FIG. 6 with respect to the relevant target microprogram or firmware.

In the following explanation, notation such as XVd may be sometimes used to express a version of the microprogram described in the microprogram columns 5231A, 5231C of the management table 5231. Regarding such notation, "X" is a variable number and represents the type of a storage apparatus with which the relevant microprogram is compatible; "V" indicates that it is a version of the microprogram; and "d" indicates that the relevant microprogram is stored on the drive side (a drive 520 newly loaded into the storage apparatus 10 or the drive 420 or 520 whose program is newly compared with that of the storage apparatus 10).

Furthermore, notation such as xXFs may be sometimes used to express a revision of the firmware described in the firmware columns 5231B, 5231D of the management table 5231. Regarding such notation, "x" is a variable number and represents the drive type with which the relevant firmware is compatible; "X" is a variable number and represents the type of a storage apparatus with which the relevant firmware is compatible; "F" indicates that it is a revision of the firmware; and "s" indicates that the relevant firmware operates on the storage apparatus side (already mounted in the storage apparatus 10).

(1-3) Firmware Update Processing as Triggered by Loading of Second Drive

Microprogram and firmware update processing executed between the second drive 520 and the storage apparatus 10 will be explained below with respect to the storage apparatus 10 having the above-described configuration.

Incidentally, in the following explanation, each first drive 420A to 420E of the disk unit 400 which is connected in advance to the system-0 controller 100 and the system-1 controller 200 in the storage apparatus 10 may be sometimes referred to as the drive 420 in operation on the storage apparatus 10. With the storage apparatus 10 including the first drives 420, it is assumed that the microprogram 4232 for A and the firmware 4233 for A are in operation. Furthermore, as mentioned earlier, an explanation about the controller 200 which operates in the same manner as the controller 100 has been omitted.

Figure 10:
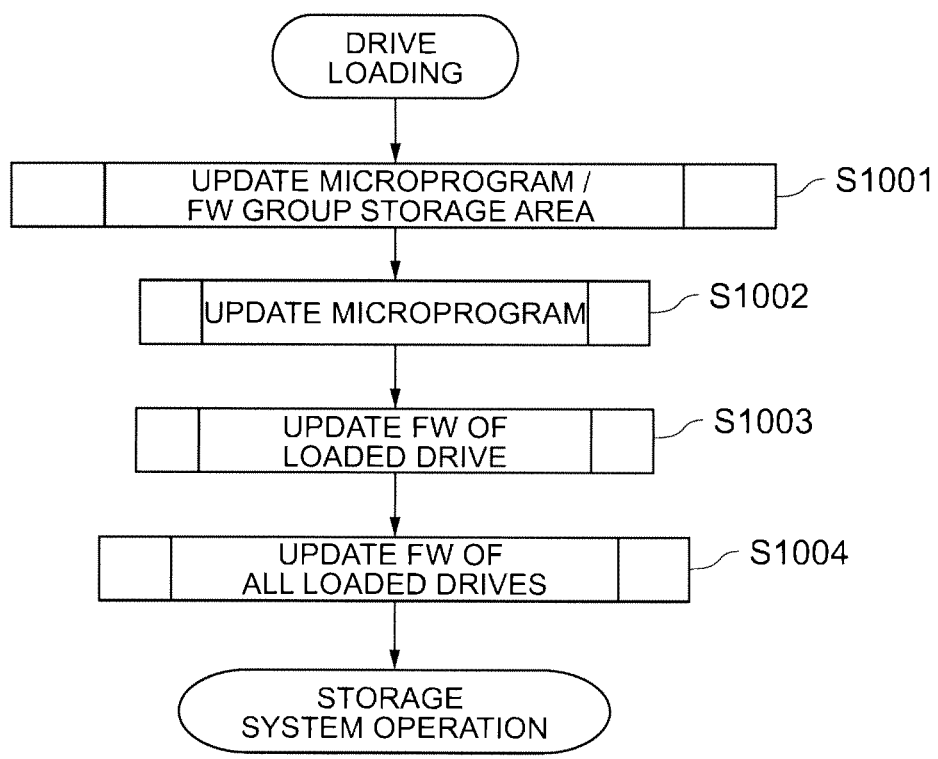
FIG. 10 is a flowchart illustrating entire processing by the storage apparatus according to the first embodiment.

FIG. 10 shows the entire processing sequence for microprogram and firmware update processing executed between the second drive 520 and the storage apparatus 10 according to the first embodiment. The processing shown in FIG. 10 is started as triggered by loading of the second drive 520 into the storage apparatus 10 by connecting the second drive 520 to the controller 100. The second drive 520 may be a second drive 520 which has been mounted in a storage apparatus of a type different from the type A storage apparatus 10.

Firstly, when the second drive 520 is loaded into the storage apparatus 10, the data controller 120 updates the microprogram/firmware group storage areas 423, 523 (step S1001). Then, the data controller 120 updates the microprogram to operate on the storage apparatus 10 (step S1002).

Next, the data controller 120 updates the firmware 5211 to operate on the second drive 520 (step S1003). Then, the data controller 120 updates the firmware 4211 to operate on all the first drives 420 mounted in the storage apparatus 10 (step S1004). Subsequently, the storage apparatus 10 performs, for example, data reading and writing in accordance with instructions from the host terminal's 30 as normal storage system operation.

Next, the processing from step S1001 to S1004 shown in FIG. 10 will be explained step by step in detail.

(1-3-1) Processing for Updating Microprogram/Firmware Group Storage Areas

Figure 11:
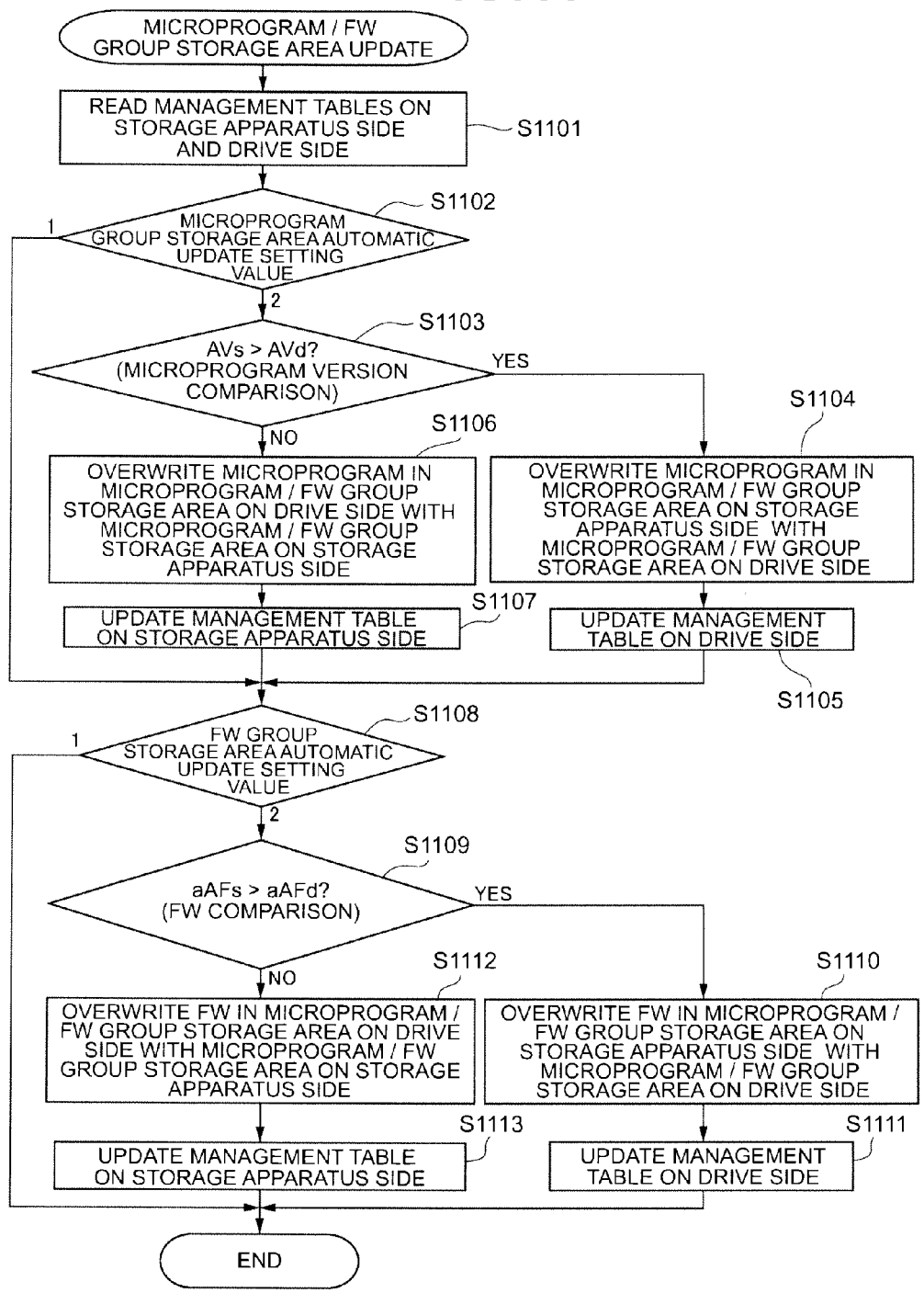
FIG. 11 is a flowchart illustrating processing for updating the microprogram/firmware group storage area.

FIG. 11 is a processing sequence for the processing for updating the microprogram/firmware group storage areas 423, 523 shown in step S1001 in FIG. 10.

Before starting the processing sequence in FIG. 11, a microprogram group storage area automatic update set value and a firmware group storage area automatic update set value are stored as parameters set by a user or the like in advance in, for example, the cache memory 160. The microprogram group storage area automatic update set value is a value to which whether the microprogram in the microprogram/firmware group storage area should be updated or not is set; and if an automatic update is not desired, "1" is set; and if the automatic update is desired, "2" is set. The firmware group storage area automatic update set value is a value to which whether the firmware in the microprogram/firmware group storage area should be updated or not is set; and if an automatic update should be performed, "1" is set; and if the automatic update should not be performed, "2" is set.

Firstly, the data controller 120 reads the management table 4231 for the first drive 420 in operation on the storage apparatus 10 and the management table 5231 for the second drive 520 (step S1101). Now, the data controller 120 checks, based on information of the management table 5231, if the microprogram 5232 for A and the firmware 5234 for A corresponding to the type A storage apparatus 10 are stored in the microprogram/firmware group storage area 523 of the second drive 520.

Next, the data controller 120 checks the microprogram group storage area automatic update set value which is set in advance by the user or the like (step S1102). If the microprogram group storage area automatic update set value is "1" in step S1102, processing in step S1108 is executed.

If the microprogram group storage area automatic update set value is "2" in step S1102, the data controller 120 compares a version of the microprogram described in the management table 4231 with a version of the microprogram described in the management table 5231 (step S1103). Specifically speaking, the data controller 120 judges whether or not the version (AVs) of the microprogram 4232 for A in operation on the storage apparatus 10, which is described in the management table 4231, is newer than the version (AVd) of the microprogram 5232 for A described in the management table 5231.

If AVs is larger than AVd in step S1103 (YES), the data controller 120 overwrites the microprogram 4232 for A stored in the microprogram/firmware group storage area 423 with the microprogram 5232 for A stored in the microprogram/firmware group storage area 523 (step S1104). Then, the read/write control unit 521 reflects the information overwritten in step S1104 in the management table 5231 (step S1105) and then executes processing in step S1108.

If the version AVs is not larger than the version AVd in step S1103 (NO), the data controller 120 overwrites the microprogram 5232 for A stored in the microprogram/firmware group storage area 523 with the microprogram 4232 for A stored in the microprogram/firmware group storage area 423 (step S1106). Then, the read/write control unit 421 reflects the information overwritten in step S1106 in the management table 4231 (step S1107) and then executes the processing in step S1108.

In step S1108, the data controller 120 checks the firmware group storage area automatic update set value which is stored in the cache memory 160 in advance. If the firmware group storage area automatic update set value is "1" in step S1108, the data controller 120 terminates the processing.

On the other hand, if the firmware group storage area automatic update set value is "2" in step S1108, the data controller 120 compares a revision of the firmware described in the management table 4231 with a revision of the firmware described in the management table 5231 (step S1109). Specifically speaking, the data controller 120 checks whether or not the revision (aAFs) of the firmware 4211 in operation on the storage apparatus 10, which is described the management table 4231, is newer than the revision (aAFd) of the firmware 5234 for A which is described in the management table 5231.

If aAFs is larger than aAFd in step S1109 (YES), the data controller 120 overwrites the firmware 4233 for A stored in the microprogram/firmware group storage area 423 with the firmware 5234 for A stored in the microprogram/firmware group storage area 523 (step S1110). Then, the read/write control unit 521 reflects the information overwritten in step S1110 in the management table 5231 (step S1105) and then terminates the processing.

If aAFs is not larger than aAFd in step S1109 (NO), the data controller 120 overwrites the firmware 5234 for A stored in the microprogram/firmware group storage area 523 with the firmware 4233 for A stored in the microprogram/firmware group storage area 423 (step S1112). Then, the read/write control unit 521 reflects the information overwritten in step S1112 in the management table 4231 (step S1113) and then terminates the processing.

(1-3-2) Microprogram Update Processing

Figure 12:
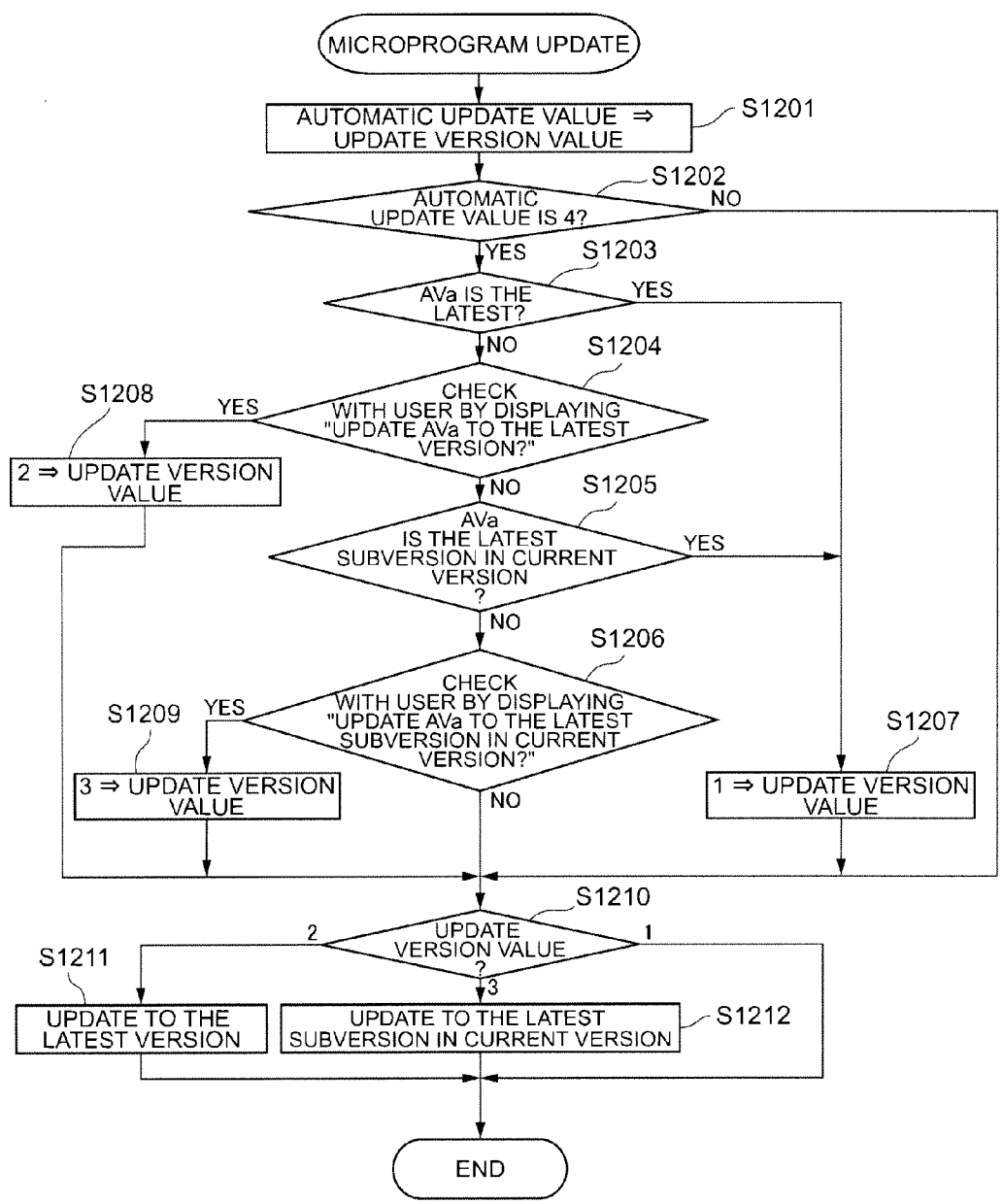
FIG. 12 is a flowchart illustrating microprogram update processing.

FIG. 12 shows a processing sequence for microprogram update processing to be operated in the storage apparatus 10 as shown in step S1002 in FIG. 10. The processing sequence shown in FIG. 12 is executed, for example, after the processing for updating the microprogram/firmware group storage areas as shown in FIG. 11 is completed.

In the following explanation, notation such as XVa may be sometimes used to express a version of the microprogram in operation on the storage apparatus 10. Regarding such notation, "X" is a variable number and represents the type of a storage apparatus with which the relevant microprogram is compatible; "V" indicates that it is a version of the microprogram; and "a" indicates that it is an active program in operation.

Before starting the processing sequence in FIG. 12, an automatic update value is stored as a parameter set by the user or the like in advance in, for example, the cache memory 160. The automatic update value is a value to which whether the microprogram in the microprogram/firmware group storage area should be updated or not is set, and to which whether the microprogram to operate on the storage apparatus 10 should be updated or not is set; and if an automatic update should be performed, "1" is set; and if the microprogram should be updated to the latest version, "2" is set; and if the microprogram should be updated to the latest sub-version of the current version, "3" is set; and if the microprogram should be updated manually, "4" is set.

The sub-version herein used corresponds to a version assigned to subdivide each version into smaller versions when the relevant version is renewed to "1," "2," and "3." Specifically speaking, the "1" part of a version "2.1" is a sub-version. For example, if a version "2.1" and a version "2.3" are compared, 2.3 is considered to be newer. Therefore, for example, if the current version is "2.1" and there are "2.2," "2.3," "3.1," and "3.2" as other versions, the latest version is "3.2" and the latest sub-version of the current version is "2.3." Incidentally, the definitions of the versions and the subversions of the microprogram are applied in the same manner to revisions and subrevisions of the firmware.

Firstly, the data controller 120 assigns the automatic update value to an update version value (step S1201) and judges whether the automatic update value is "4" or not (step S1202).

If the automatic update value is "4" in step S1202 (YES), processing in step S1203 is executed. If the automatic update value is other than "4" in step S1202 (NO), processing in step S1210 is executed.

In step S1203, the data controller 120 checks if the version (AVa) of the microprogram in operation on the cache memory 160 is the latest version or not. Specifically speaking, for example, the data controller 120 compares information of the microprogram in operation on the cache memory 160 with information of the microprogram described in the management tables 4231, 5231. When this is performed, the data controller 120 may use the drive management table 71 explained with reference to FIG. 3.

If AVa is the latest version in step S1203 (YES), processing in step S1207 is executed. If AVa is not the latest version in step S1203 (NO), processing in step S1204 is executed.

In step S1204, the data controller 120 displays a statement reciting, for example, "Will AVa be updated to the latest version?" on a display unit (not shown in the drawing) of the controller 100 and thereby checks with the user if AVa can be updated to the latest version or not. Then, if the user inputs that AVa is to be updated to the latest version (YES in step S1204), processing in step S1208 is executed. If the user inputs that AVa is to be not updated to the latest version (NO in step S1204), processing in step S1205 is executed.

In step S1205, the data controller 120 refers to data in the same manner as in step S1203 and checks if the version (AVa) of the microprogram in operation on the cache memory 160 is the latest sub-version of the current version or not.

If the version (AVa) is the latest sub-version of the current version in step S1205 (YES), processing in step S1207 is executed. If AVa is not the latest sub-version of the current version in step S1205 (NO), processing in step S1206 is executed.

In step S1206, the data controller 120 displays a statement reciting, for example, "Will AVa be updated to the latest sub-version?" on the display unit (not shown in the drawing) of the controller 100 and thereby checks with the user if AVa can be updated to the latest sub-version of the current version or not. Then, if the user inputs that AVa is to be updated to the latest sub-version (YES in step S1206), processing in step S1209 is executed. If the user inputs that AVa is to be not updated to the latest sub-version (NO in step S1206), processing in step S1210 is executed.

Now, in step S1207, the data controller 120 sets "1" to the update version value in order to indicate that AVa is the latest version. Furthermore, in step S1208, the data controller 120 sets "2" to the update version value in order to indicate that it is necessary to update AVa to the latest version. Furthermore, in step S1209, the data controller 120 sets "3" to the update version value in order to indicate that it is necessary to update AVa to the latest sub-version.

In step S1210, the data controller 120 checks the update version value. If the update version value is "1," the processing is terminated.

If the update version value is "2" in step S1210, the data controller 120 updates the microprogram in operation on the cache memory 160 to the microprogram of the latest version. Now, the storage position of the microprogram of the latest version can be identified by referring to the management tables 4231, 5231 and the microprogram of the latest version can be obtained from the microprogram/firmware group storage area 423 or the microprogram/firmware group storage area 523.

If the update version value is "3" in step S1210, the data controller 120 updates the microprogram in operation on the cache memory 160 to the microprogram of the latest sub-version. Now, the storage position of the microprogram of the latest sub-version can be identified by referring to the management tables 4231, 5231 and the microprogram of the latest sub-version can be obtained from the microprogram/firmware group storage area 423 or the microprogram/firmware group storage area 523.

Incidentally, the microprogram can be updated to the setting desired by the user as a result of the processing from step S1201 to step S1210. However, for example, if the firmware cannot be operated in the storage apparatus 10 unless the microprogram is updated to a specified version or newer version, processing by the data controller 120 for checking with the user again by displaying a statement reciting, for example, "Shall we update the microprogram?," on the display unit may be added.

(1-3-3) Firmware Update Processing on Newly Loaded Drive

Figure 13:
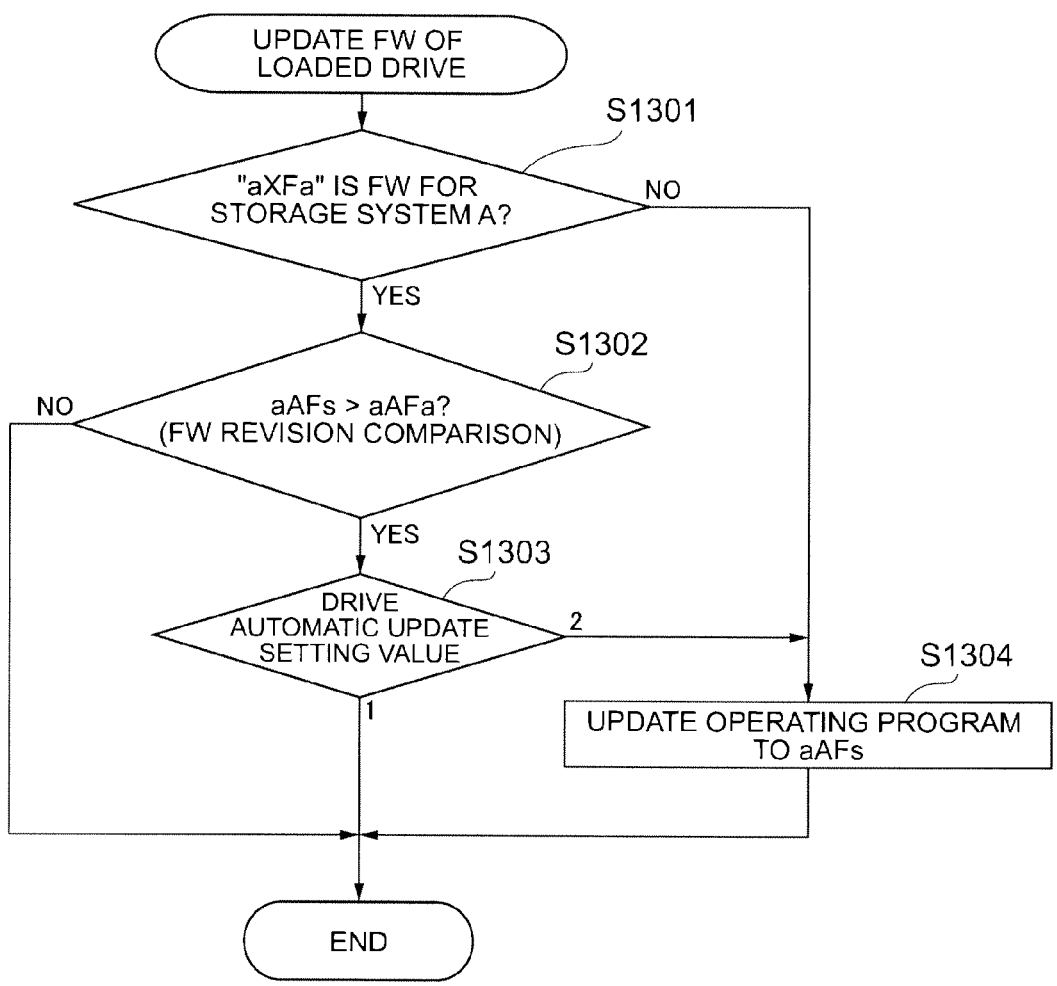
FIG. 13 is a flowchart illustrating firmware update processing.

FIG. 13 shows a processing sequence for updating the firmware 5211 to operate on the second drive 520 as shown in step S1003 in FIG. 10. The processing sequence shown in FIG. 13 is executed, for example, after completing the microprogram update processing shown in FIG. 12.

In the following explanation, notation such as xXFa may be sometimes used as a revision of the firmware 5211 in operation on the second drive 520. Regarding such notation, "x" is a variable number and represents the drive type with which the relevant firmware is compatible; "X" is a variable number and represents the type of a storage apparatus with which the relevant firmware is compatible; "F" indicates that it is a revision of the firmware; and "a" indicates that it is an active program in operation.

Before starting the processing sequence in FIG. 13, a first drive automatic update set value is stored as a parameter set in advance by the user or the like in, for example, the cache memory 160. The first drive automatic update set value is a value to which whether the firmware in the microprogram/firmware group storage area should be updated or not is set. If the update is not desired, "1" is set; and if the update to the latest revision is desired, "2" is set.

Firstly, the data controller 120 checks whether or not the firmware (revision: aXFa) 5211 in operation on the read/write control unit 521 of the second drive 520 is of the same type as that of the firmware for A in operation on the storage apparatus 10 (step S1301).

If aXFa is the firmware for A in step S1301 (YES), processing in step S1302 is executed. If aXFa is not the firmware for A in step S1301 (NO), processing in step S1304 is executed.

In step S1302, the data controller 120 refers to the management tables 4231, 5231, compares the revision (aAFs) of the firmware 4211 in operation on the storage apparatus 10 side with the revision (aAFa) of the firmware 5211 in operation on the second drive 520 side, and judges whether aAFs is larger than aAFa or not. If aAFs is larger than aAFa in step S1302, processing in step S1303 is executed; and if aAFs is not larger than aAFa, processing in step S1304 is executed.

In step S1303, the data controller 120 checks the first drive automatic update set value. If the first drive automatic update set value is "1" in step S1303, the processing is terminated. If the first drive automatic update set value is "2" in step S1303, processing in step S1304 is executed.

In step S1304, the data controller 120 updates the firmware 5211 in operation on the read/write control unit 521 of the second drive 520 to the firmware 4211 (revision aAFs) in operation on the storage apparatus 10 side.

The firmware operating on the read/write control unit 521 of the second drive 520 can be updated according to the setting desired by the user by means of the processing from step S1301 to step 1304 described above.

Incidentally, even in a case of firmware as in the case where the microprogram can be updated by selecting the latest version or the latest sub-version in FIG. 12, the firmware can be updated by applying the processing in FIG. 12 to updates of the firmware and by selecting the latest revision or the latest sub-revision according to the setting desired by the user.

(1-3-4) Firmware Update Processing on all Loaded Drives

Figure 14:
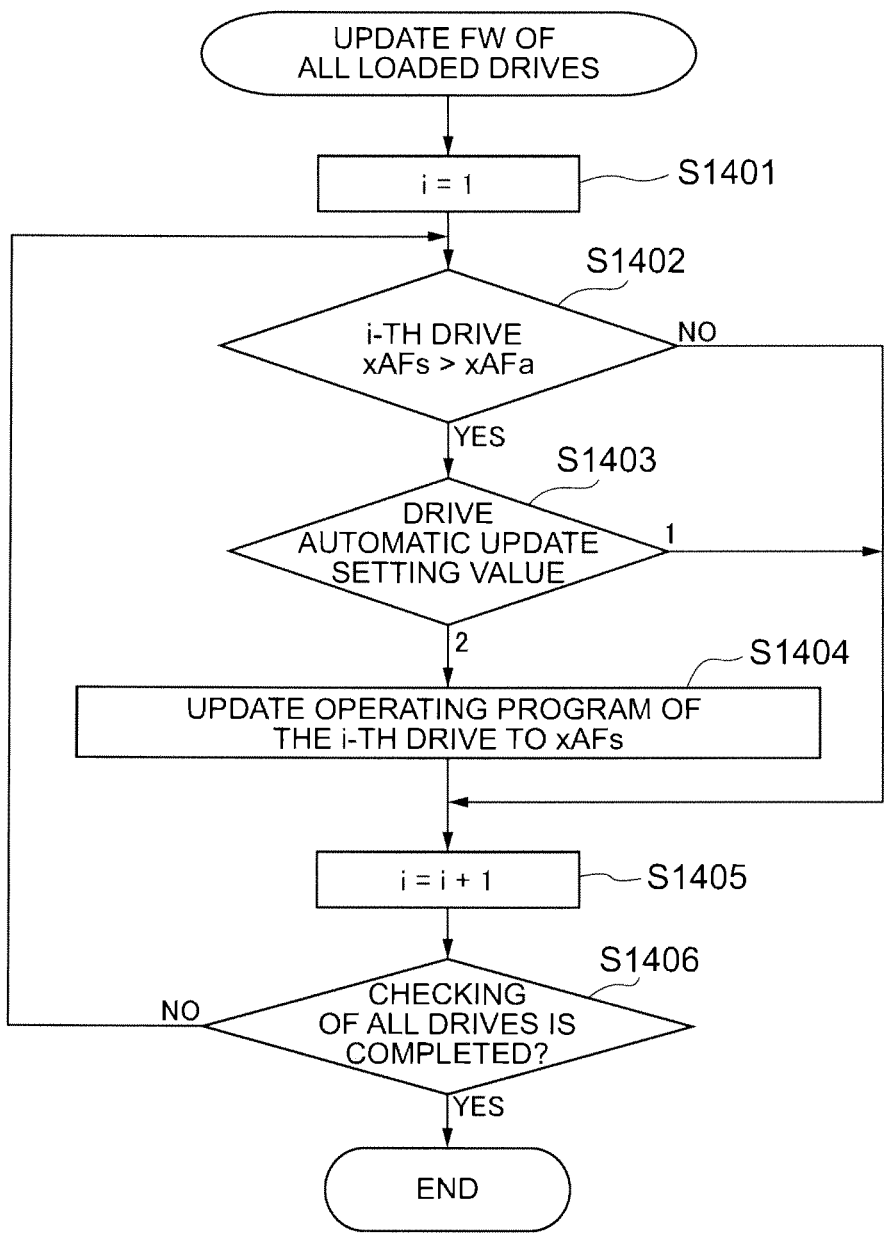
FIG. 14 is a flowchart illustrating processing for updating firmware of all loaded drives.

FIG. 14 is a processing sequence shown in step S1004 in FIG. 10 for updating the firmware 4211 which operates on all the first drives 420A to 420E mounted in the storage apparatus 10. The processing sequence shown in FIG. 14 is executed, for example, after completing the firmware update processing on a newly loaded drive as shown in FIG. 13.

Before starting the processing sequence in FIG. 14, a second drive automatic update set value is stored as a parameter set in advance by the user or the like in, for example, the cache memory 160. The second drive automatic update set value is a value to which whether the firmware in the microprogram/firmware group storage area should be updated or not is set; and if the update is not desired, "1" is set; and if the update to the latest revision is desired, "2" is set. This second drive automatic update set value may be a value set in common with the first drives 420A to 420E or a value individually set to the first drives 420A to 420E.

Firstly, the data controller 120 sets 1 as a value of parameter i to be retained in the shared memory 170 (step S1401). The parameter i is a parameter for designating the first drive 420 for executing the processing. For example, in a case of the first drives 420A to 420E, the value from 1 to 5 is assigned to i.

Next, the data controller 120 compares the revision (xAFs) of the firmware in operation on the storage apparatus 10 side with the revision (xAFa) of the firmware 4211 in operation on the i-th first drive 420 and judges whether xAFs is larger than xAFa or not (step S1402). If xAFs is larger than xAFa in step S1402, processing in step S1403 is executed; and if xAFs is not larger than xAFa, processing in step S1405 is executed.

In step S1403, the data controller 120 checks the second drive automatic update set value. If the second drive automatic update set value is "1" in step S1403, processing in step S1405 is executed; and if the second drive automatic update set value is "2," processing in step S1404 is executed.

In step S1404, the data controller 120 updates the firmware 4211 in operation on the read/write control unit 421 of the i-th first drive 420 to the firmware (revision xAFs) in operation on the storage apparatus 10 side and then processing in step S1405 is executed.

In step S1405, the data controller 120 increases the value i one by one. Then, in step S1406, whether the processing has been executed on all the first drives 420A to 420E or not is checked based on the value i.

If it is determined in step S1406 that the first drive 420 on which the execution of the processing has not been completed exists (NO), the processing returns to step S1402 and then continues. If it is determined in step S1406 that the processing on all the first drives 420A to 420E has been completed (YES), the processing is terminated.

The firmware which operates on all the first drives 420 to 420E mounted in the storage apparatus 10 can be updated by the processing from step S1401 to step S1406 described above; however, the processing shown in FIG. 14 does not always have to be executed on all the first drives 420A to 420E and the processing may be executed only on a specified first drive 420.

As triggered by loading of the second drive 520 into the storage apparatus 10, the storage apparatus 10 according to the first embodiment as described above can update the microprogram and firmware which are suited for the storage apparatus 10, where the drive is loaded, from the storage apparatus 10 to the second drive 520 side.

Furthermore, as triggered by loading of the second drive 520 into the storage apparatus 10, the storage apparatus 10 can also update the microprogram and firmware, which are stored in the second drive 520, to the first drive 420 side which is already mounted in the storage apparatus 10. Furthermore, this update is not limited to one first drive 420, but also can be applied to the plurality of first drives 420A to 420E constituting the disk unit 400.

The advantageous effect of the storage apparatus 10 described above will be explained by citing a specific example. For example, regarding a WEB site that places importance on security, the storage apparatus 10 cannot be connected via a LAN to that WEB site and firmware of a new drive authorized after shipment of the storage apparatus 10 cannot be distributed or updated through the WEB site. However, according to the first embodiment, firmware of a new drive can be stored in the first drive 420 on the storage apparatus 10 side by connecting the second drive 520, in which the firmware of the new drive is stored, to the storage apparatus 10 and loading it into the storage apparatus 10.

Furthermore, with the storage apparatus 10 according to the first embodiment, the second drive 520 stores the microprograms 5232, 5233 and the firmware 5234, 5235, so that the second drive 520 can be loaded into not only the type A storage apparatus 10, but also the type B storage apparatus. Specifically speaking, the second drive 520 according to the first embodiment can be loaded into a plurality of storage apparatuses including different types of storage apparatuses as it is compatible with each type of storage apparatus. Therefore, the storage apparatus 10 does not have to prepare a plurality of types of second drives 520 to match the corresponding storage apparatuses; and since the storage apparatus 10 is provided with the second drive 520, regarding which one second drive 520 can be loaded into different types of storage apparatuses, it is possible to inhibit an increase of inventory and complications of management and reduce tediousness and complications in drive inventory management. Furthermore, curbing an increase of management cost can be expected by inhibiting the increase of the drive inventory and the complications of management.

Furthermore, when updating the microprogram or firmware in the storage apparatus 10 according to the first embodiment, each relevant program can be updated in accordance with a plurality of levels of update settings requested by the user. Specifically speaking, the update settings of, for example, whether an update can be performed or not, whether an update to the program of the latest version/revision should be permitted or not, and whether an update to the latest sub-version in the current version should be permitted or not, can be realized.

Incidentally, all storage apparatuses according to second to sixth embodiments described below can be realized basically with the same configuration as that of the storage apparatus 10 according to the first embodiment. Therefore, in the following explanation of the second to sixth embodiments, the storage apparatus 10, to which the same reference numeral as used in the first embodiment is assigned, will be used as the relevant storage apparatus.

(2) Second Embodiment (2-1) Characteristic Configuration of Storage Apparatus According to this Embodiment Before explaining the storage apparatus 10 according to the second embodiment, a general explanation will be given about the difference of drive processing performance due to the difference of operating firmware. Generally, regarding the drive, the operation to enhance total pedal mance can be realized by rearranging the order of command execution. However, if the command execution order is rearranged, a command whose execution has been delayed occurs. So, such rearrangement of the command execution order is not desirable if the user wishes to terminate the execution of all commands in a certain short period of time.

Now, the storage apparatus 10 according to the second embodiment is characterized in that firmware with different functions is switched in compliance with requests from the user.

2-2) Firmware Update Processing as Triggered by Specified Instruction (for Example, Firmware Update Request In the following explanation, processing for preparing first firmware, which places importance on total performance of the drives, and second fii mware, which places importance on a response speed for each command, and changing the firmware to operate on the first drive 420 in accordance with a request from the user will be explained as an example of processing by the storage apparatus 10 according to the second embodiment.

Firstly, the storage apparatus 10 according to the second embodiment updates the firmware of the first drive 420 as triggered by a specified instruction given directly from the user or via the host terminal 30. Furthermore, the first drive 420 may update the firmware as triggered by replacement of, for example, a ROM. The configuration of the storage apparatus 10 according to the second embodiment is the same as that of the storage apparatus 10 shown in FIG. 1 and an explanation of each component has been omitted. Incidentally, the first firmware and the second firmware may obtain firmware from a newly connected second drive 520 as explained with respect to the storage apparatus 10 according to the first embodiment.

Figure 15:
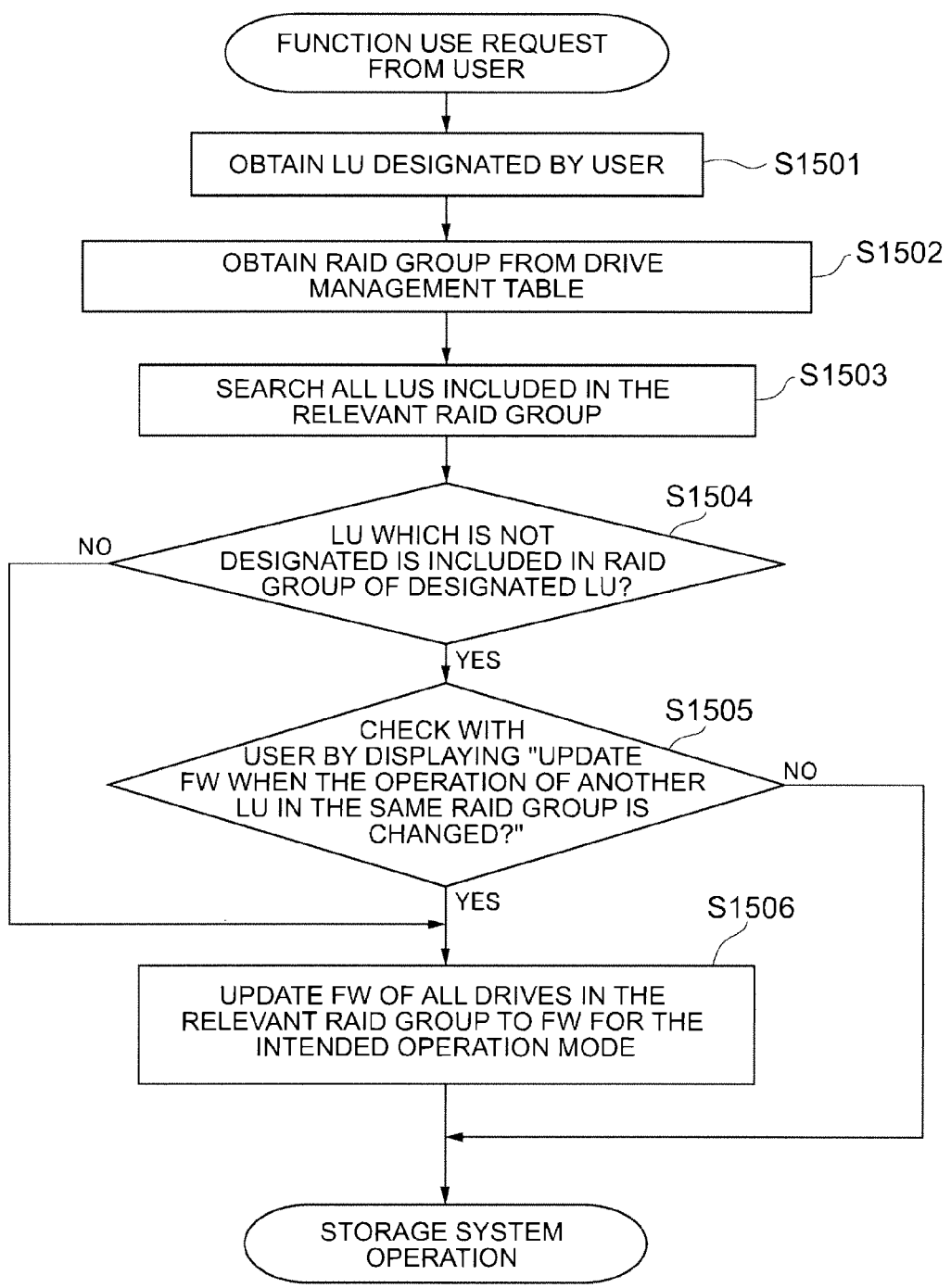
FIG. 15 is a flowchart illustrating firmware update processing by a storage apparatus according to a second embodiment.

FIG. 15 is a processing sequence executed by the storage apparatus 10 according to the second embodiment for updating the firmware as triggered by a specified instruction (firmware update request) from the user. The firmware update request is a request input by the user when they want to change the firmware to operate on the first drive 420 on an LU basis; and designates an LU whose firmware is to be changed, and the firmware to be changed (first firmware or second firmware).

Firstly, after receiving the firmware update request from the user, the data controller 120 obtains the LU designated by the firmware update request (step S1501).

Next, the data controller 120 refers to the drive management table 71 stored in the shared memory 170 and obtains all RAID groups constituted from the first drives 420A to 420E (step S1502). Then, the data controller 120 searches for all LUs included in the RAID groups with respect to all the RAID groups obtained in step S1502 (step S1503).

The details of steps S1502, S1503 will be explained. For example, in a case of the drive management table 71 shown in FIG. 3, the data controller 120 obtains RAID groups RAID01 to RAID03 in step S1502 and searches for LU1 to LU9 in step S1503.

Next, in step S1504, the data controller 120 judges whether or not an LU which is not designated by the firmware update request is included in the RAID group including the LU designated by the firmware update request. If the aforementioned management table in FIG. 3 is taken as an example and if LU6 is designated by the firmware update request, the data controller 120 judges whether or not an LU(s) other than LU6 is included in RAID01 which includes LU6. In this case, it is found that LU4 and LU7 are included in RAID01.

If a non-designated LU is included in step S1504 (YES), processing in step S1505 is executed; and if a non-designated LU is not included in step S1504 (NO), processing in step S1506 is executed.

The firmware cannot be changed on the LU basis within the same RAID group. So, in step S1505, the data controller 120 displays a statement reciting, for example, "Operation of another LU included in the same RAID group is to be changed, and shall we change firmware?" on the display unit (not shown in the drawing) of the controller 100 and thereby checks with the user if the firmware of the designated LU is to be updated or not. Then, if the user inputs that the firmware is to be updated (YES in step S1505), processing in step S1506 is executed. If the user inputs that the firmware is to be not updated (No in step S1505), the processing is terminated.

In step S1506, the data controller 120 updates the firmware to operate on the read/write control unit 421 of the relevant first drive 420 to the firmware designated by the firmware update request with respect to all the first drives 420 constituting the relevant RAID group.

With such a storage apparatus 10, the firmware to operate on the first drive 420 can be updated to the first firmware or the second firmware for each LU as triggered by the firmware update request. As a result, switching of functions can be realized by having the firmware, which places importance on the total performance, and the firmware, which places importance on the response speed for each command, operate on the LU basis.

Furthermore, by combining the processing on the second drive 520 as explained in the first embodiment, the first firmware or second firmware stored in the second drive 520, or both such firmware can be obtained on the storage apparatus 10 side and the obtained first firmware or second firmware can be operated on the first drive 420 included in the designated LU.

Incidentally, the storage apparatus 10 according to the second embodiment has been explained by using the first firmware which places importance on the total performance and the second firmware which places importance on the response speed for each command; however, the characteristics of the firmware are not limited to the above-described characteristics and, for example, firmware for low performance can be switched with normal firmware, firmware for a low number of rotations can be switched with firmware for a normal number of rotations, firmware for an encryption mode can be switched with firmware for a plaintext mode, or firmware for energy saving can be switched with normal firmware in accordance with designation by the user. Furthermore, these pieces of firmware are not limited to two functions and firmware with three or more functions may be prepared and the firmware in operation may be switched accordingly.

The storage apparatus 10 can realize a plurality of operations by using one second drive 520 by providing the second drive 520 with a plurality of pieces of firmware with different operations or functions and switching the firmware according to the intended use as described above.

(3) Third Embodiment (3-1) Characteristic Configuration of Storage Apparatus According to this Embodiment The second embodiment has described the storage apparatus 10 which changes the function for each RAID group including a specified LU by switching the firmware; however, if a failure occurs in a drive used under a specified function setting, that drive needs to be removed and replaced. When this happens, the problem is that a replacement drive cannot continue using the function of the relevant RAID group unless firmware of the same type as that of the firmware in operation in the RAID group for which the replacement was performed is operated.

The storage apparatus 10 according to the third embodiment is characterized in that the drive is replaced in consideration of the above-described problem.

Figure 16:
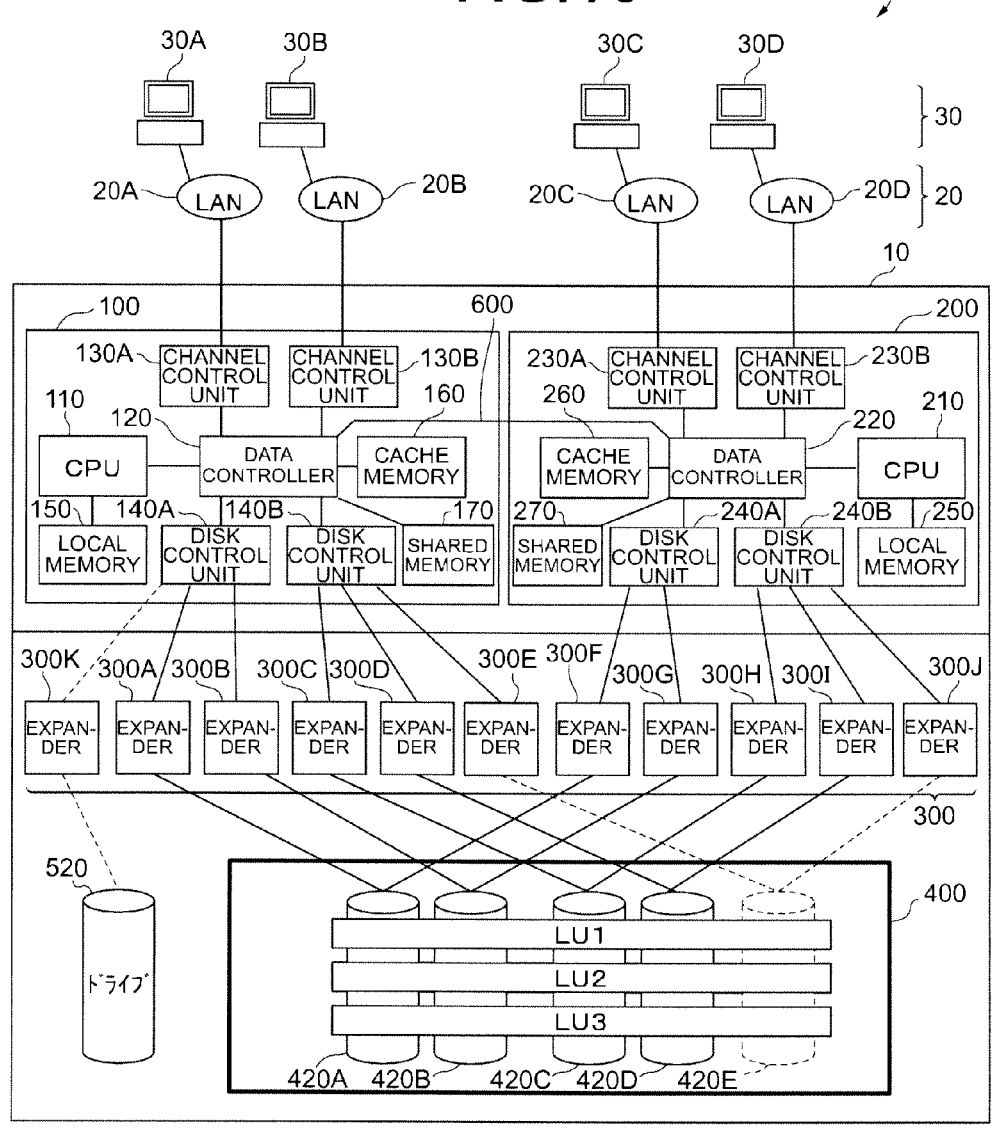
FIG. 16 is a block diagram showing the configuration of a storage apparatus according to a third embodiment.

FIG. 16 shows the storage apparatus 10 according to the third embodiment. The configuration of the storage apparatus 10 shown in FIG. 16 is the same as the configuration of the storage apparatus 10 shown in FIG. 1 and its explanation has been omitted. In the third embodiment, the first drive 420E mounted in the storage apparatus 10 is removed and replaced with the second drive 520. Then, as a example, it is assumed that an encryption function of a RAID group to which the first drive 420E belongs is valid.

Figure 17:
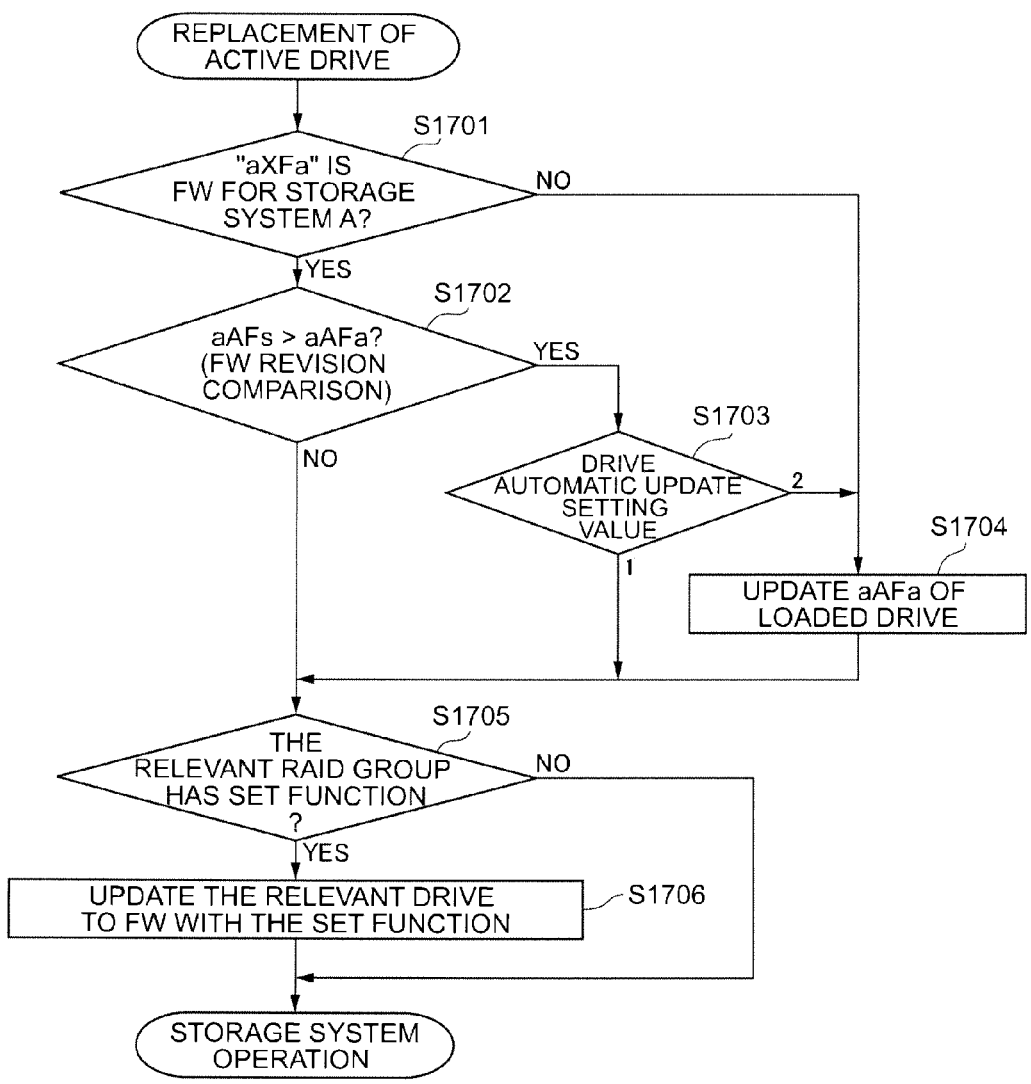
FIG. 17 is a flowchart illustrating processing for updating firmware as triggered by loading of a drive for replacement.

(3-2) Firmware Update Processing as Triggered by Replacement of One of First Drives with Second Drive FIG. 17 is a processing sequence for updating the firmware as triggered by loading of the second drive 520 for replacement. When this happens, the first drive 420E has already been removed from the storage apparatus 10.

Before starting the processing sequence in FIG. 17, a third drive automatic update set value is stored as a parameter set in advance by the user or the like in, for example, the cache memory 160. The third drive automatic update set value is a value to which whether the firmware should be updated or not is set; and if the update is not desired, "1" is set; and if the update to the latest revision is desired, "2" is set.

Firstly, the data controller 120 checks if the firmware 5211 (revision: aXFa) in operation on the read/write control unit 521 of the second drive 520 is the firmware for A which operates on the storage apparatus 10 side or not (step S1701). If the firmware 5211 in operation on the read/write control unit 521 is the firmware for A in step S1701 (YES), processing in step S1702 is executed. If the firmware 5211 in operation on the read/write control unit 521 is not the firmware for A (NO), processing in step S1704 is executed.

In step S1702, the data controller 120 refers to the management tables 4231, 5231, compares the revision (aAFs) of the firmware 4211 in operation on the storage apparatus 10 side with the revision (aAFa) of the firmware 5211 in operation on the second drive 520 side, and judges whether aAFs is larger than aAFa or not (comparison of new and old revisions). If aAFs is larger than aAFa in step S1702, processing in step S1703 is executed; and if aAFs is not larger than aAFa, processing in step S1705 is executed.

In step S1703, the data controller 120 checks the third drive automatic update set value. If the third drive automatic update set value is "1" in step S1303, processing in step S1705 is executed. If the third drive automatic update set value is "2" in step S1703, processing in step S1704 is executed.

In step S1704, the data controller 120 updates the firmware 5211 (revision aAFa) in operation on the read/write control unit 521 of the second drive 520 to the firmware 4211 (revision aAFs) in operation on the storage apparatus 10 side. Subsequently, processing in step S1705 is executed.

In step S1705, the data controller 120 refers to the drive management table 71 stored in the shared memory 170 and checks if a special function is set to a RAID group where the second drive 520 is loaded. The special function means that, for example, the encryption function is valid. If the relevant RAID group has the set function (YES), processing in step S1706 is executed. If the relevant RAID group does not have the set function in step S1705 (NO), the processing is terminated.

Then, in step S1706, the firmware 5211 in operation on the read/write control unit 521 of the second drive 520 is updated to the firmware 4211 in operation on the read/write control unit 421 of the first drive 420 which belongs to the relevant RAID group. Subsequently, the processing is terminated.

As a result of the processing from step S1701 to step S1706 described above, the second drive 520 can operate, in place of the first drive 420E, in the RAID group to which the first drive 420E belonged. Specifically speaking, for example, the first drive 420E can be replaced with the second drive 520 in the RAID group, to which the encryption function is set to valid, by keeping the encryption function valid. Incidentally, when the second drive 520 is loaded into the storage apparatus 10, the microprogram and firmware update processing shown in FIG. 10 may be executed first.

Furthermore, regarding the above-described processing for replacing the drive, the number of the drive to be replaced is not limited to one and the above-described processing can be implemented also when removing two or more first drives 420 and loading the second drive 520.

If a failure or the like occurs in a drive used under the condition, where a specified function is set, and the drive is replaced, the above-described storage apparatus 10 according to the third embodiment automatically updates the operating firmware to the firmware with the function used for the RAID group with respect to the second drive 520 which has replaced the failed drive. So, the storage apparatus 10 can continue using the second drive 520 under the condition where the function is set for the relevant RAID group.

(4) Fourth Embodiment (4-1) Characteristic Configuration of Storage Apparatus According to this Embodiment For example, when a new high-performance drive is loaded into the storage apparatus 10, in which RAID groups are constituted from a plurality of drives, for the purpose of, for example, maintenance replacement, the performance difference occurs between the drives within the same RAID group. If the performance difference between the drives is left unadjusted in such a case, a higher-performance drive responds to a command sent from the controller 100 to the relevant RAID group before a lower-performance drive does. Then, the resulting problem is that, for example, the memory may be occupied as a result of the failure to sufficiently execute command processing on the low-performance drive.

FIG. 18 is a performance group correspondence table 72 which shows an example of performance groups corresponding to the drive types. The performance group correspondence table 72 includes a drive type name 72A indicating the type of the relevant drive and a performance group 72B corresponding to the relevant drive type. Regarding "1" to "4" in the performance group 72B in FIG. 18, the size of the number indicates performance levels and a performance group "4" indicates the highest performance. As the performance group 72B is decided corresponding to the drive type name 71A in FIG. 18, the drive performance difference depends on the drive type. Furthermore, generally, the range of the performance group 72B of drives which can be loaded into a specified RAID group is decided; and as a result, the performance of the RAID group corresponds to the type of the loaded drives.

So, the storage apparatus 10 according to the fourth embodiment is characterized in that when the second drive 520 is loaded into the storage apparatus 10 and if there is a performance difference between the second drive 520 and another first drive 420 of the RAID group to which the relevant drive belongs, firmware which would reduce the performance difference is selected and the firmware of the relevant first drive 420 and second drive 520 is automatically changed.

With the storage apparatus 10 according to the fourth embodiment described below, it is assumed that a standard table for judging the above-described performance groups is stored in advance in, for example, the shared memory 170.

Figure 19:
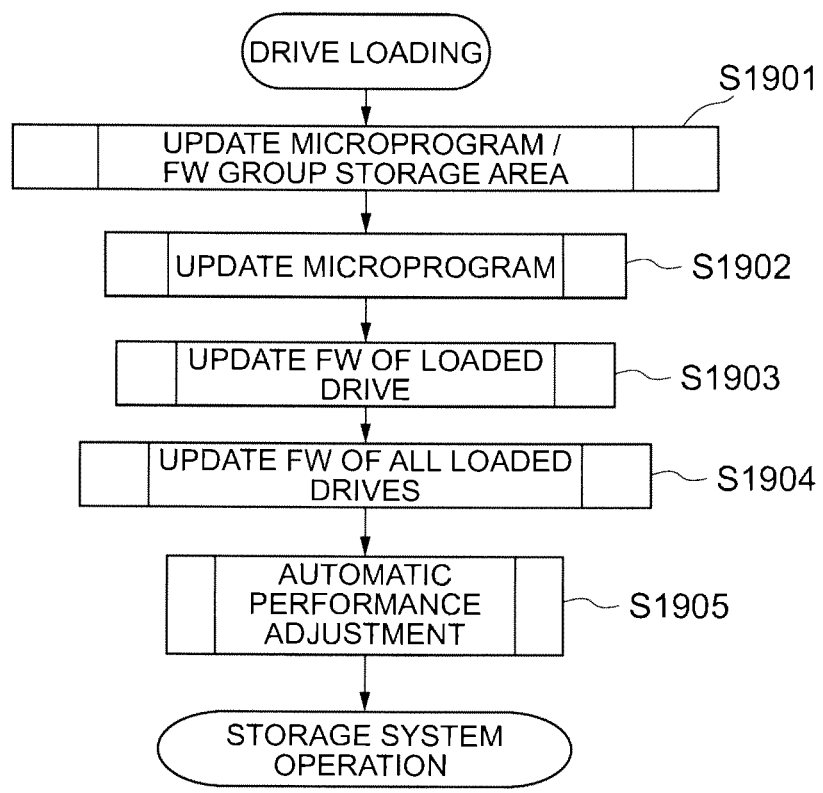
FIG. 19 is a flowchart illustrating firmware update processing by a storage apparatus according to a fourth embodiment.

(4-2) Firmware Update Processing for Adjusting Performance Difference Between Drives as Triggered by Loading of Second Drive FIG. 19 is a processing sequence for updating firmware to adjust the performance difference between the drives in the RAID group as triggered by loading of the second drive 520 into the storage apparatus 10 according to the fourth embodiment. Processing from step S1901 to step S1904 is the same as the processing in step S1001 to S1004 shown in FIG. 10, so its explanation has been omitted.

After the processing in step S1904 terminates, the data controller 120 executes automatic performance adjustment processing for adjusting the performance difference between the second drive 520 and the first drives 420 constituting the RAID group where the second drive 520 is loaded (step S1905).

Figure 20:
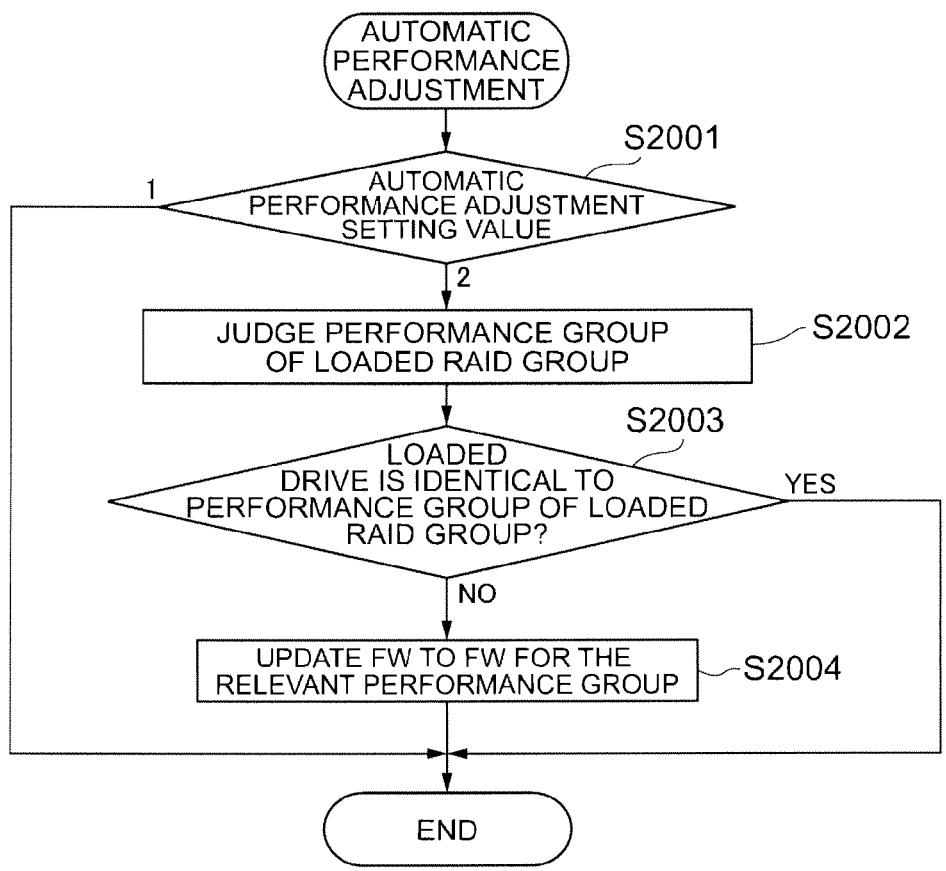
FIG. 20 is a flowchart illustrating automatic performance adjustment processing.

FIG. 20 is a processing sequence for the automatic performance adjustment processing shown in step S1905 in FIG. 19. Before starting the processing sequence in FIG. 20, an automatic performance adjustment set value is stored as a parameter set in advance by the user or the like in, for example, the cache memory 160. The automatic performance adjustment set value is a value to which the performance should be automatically adjusted or not is set; and if the function performing the automatic performance adjustment is to be set to OFF, "1" is set; and if the function performing the automatic performance adjustment is to be set to ON, "2" is set.

Firstly, the data controller 120 refers to the cache memory 160 and checks the automatic performance adjustment set value (step S2001). If the automatic performance adjustment set value is "1," the processing is terminated. If the automatic performance adjustment set value is "2," processing in step S2002 is executed.

In step S2002, the data controller 120 refers to the standard table stored in the shared memory 170 and identifies a performance group of the RAID group where the second drive 520 is loaded.

Then, in step S2003, the data controller 120 judges whether or not a performance group according to the drive type of the second drive 520 is identical to the performance group identified in step S2002. The drive type of the second drive 520 can be confirmed with the management table 5231. If it is determined in 2003 that the performance group according to the drive type of the second drive 520 is identical to the performance group identified in step S2002 (YES), the processing is terminated. If it is determined in step S2003 that the performance group according to the drive type of the second drive 520 is not identical to the performance group identified in step S2002 (NO), processing in step S2004 is executed.

In step S2004, the data controller 120 selects firmware according to an appropriate performance level for adjusting the performance difference of the relevant RAID group and updates the firmware operating on the second drive 520 with the selected firmware. Specifically speaking, for example, if the drive type of the second drive 520 is a performance group 5 and the drive type of the first drive 420 in the RAID group where the relevant drive is loaded is a performance group 3 whose performance is lower than that of the performance group 5, the data controller 120 updates the firmware to operate on the read/write control unit 521 of the second drive 520 to the firmware corresponding to the performance group 3.

Incidentally, the drive whose firmware is updated by the data controller 120 in step S2004 is not limited to the second drive 520 and may be one or more first drives 420 of the RAID group where the second drive 520 is loaded.

Furthermore, the "appropriate performance level for adjusting the performance difference of the relevant RAID group" in step S2004 may be, for example, a performance level of the lowest-performance drive among all the drives mounted in the relevant RAID group or an average performance level. Furthermore, a plurality of patterns may be prepared as the performance levels of the firmware to be updated.

Furthermore, if a performance level of a drive which is not mounted in the current RAID group, but may possibly be loaded in the future is known, the "appropriate performance level for adjusting the performance difference of the relevant RAID group" in step S2004 may be a performance level decided in consideration of the performance level of the drive which may possibly be added and loaded.

Now, an example of the performance levels will be explained by referring to the performance group table in FIG. 18. For example, it is assumed that there is a RAID group 04 composed of only the first drives 420A, 420B of a drive type g and the first drive 420C of a drive type c may possibly be loaded as a maintenance component into RAID04. Referring to FIG. 18, the first drives 420A, 420B belong to a performance group 4 and the first drive 420C belongs to a performance group 2. Under this circumstance, RAID04 can be operated by the performance group 4 in normal time; however, if the first drive 420C which is a maintenance component belonging to the performance group 2 is loaded, the performance difference occurs between the first drives 420A, 420B and the first drive 420C. Then, there is a possibility that the command processing at the first drive 420C may become unstable. It is not desirable if the processing becomes unstable due to the maintenance operation by the first drive 420C. So, RAID04 has the firmware corresponding to the performance group 2 of the first drive 420C operate even in normal time, regardless of the timing when the first drive 420C which is the maintenance component is loaded. In this case, in step S2004, the firmware operating on the first drives 420A, 420B is updated by the firmware corresponding to the performance group 2.

The storage apparatus 10 can automatically adjust the performance of the drives in the same RAID group based on the performance groups by executing the processing from step S1901 to step 1905 and from step S2001 to step 2004 described above.

The above-described storage apparatus 10 can solve the problems such as the memory being occupied as caused by the difference of command processing ability due to the significant performance difference, by intentionally updating the firmware operating in the RAID group to the firmware of a low performance level in conformity with the low-performance drive. As a result, even if a RAID group is constituted from the drives with the performance difference, guarantee of normal operation can be expected for the storage apparatus 10.

Furthermore, the above-described storage apparatus 10 can intentionally update the firmware operating in the RAID group to the firmware of a low performance level. So, when setting a basic specification at the time of shipment of products, the storage apparatus 10 can be used for the purpose of standardization of firmware of a performance level that can reliably guarantee the performance.

(5) Fifth Embodiment (5-1) Characteristic Configuration of Storage Apparatus According to this Embodiment The storage apparatus 10 according to a fifth embodiment is characterized in that, in addition to the microprogram and firmware update processing, a copyback and automatic performance adjustment of the second drive 520 are performed as triggered by replacement of the first drive 420E mounted in the storage apparatus 10 with the second drive 520 at the time of, for example, the occurrence of a failure.

According to the fifth embodiment, data stored in the first drive 420E is backed up to (or stored in) a storage area of another first drive 420 in the same RAID group or the controller 100 before removing the first drive 420E from the storage apparatus 10.

Figure 21:
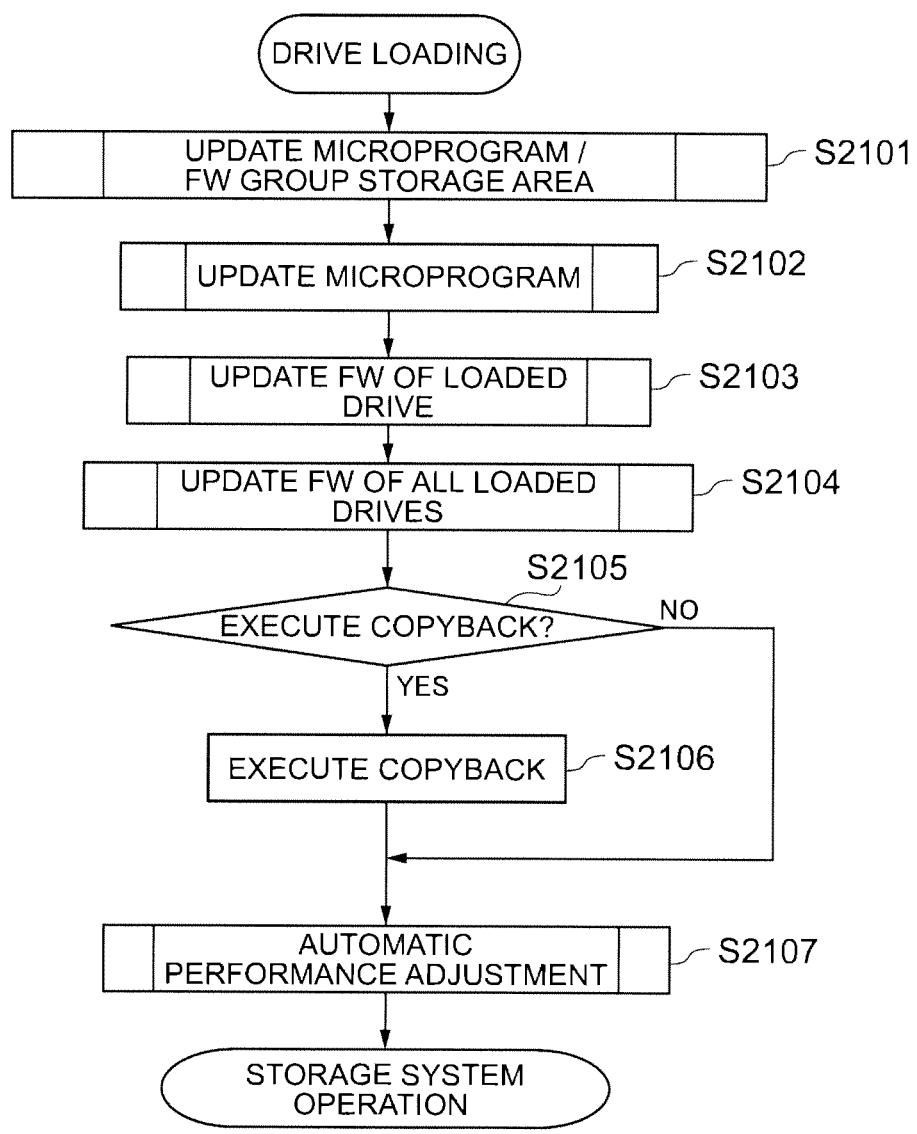
FIG. 21 is a flowchart illustrating entire processing by a storage apparatus according to a fifth embodiment.

(5-2) Firmware Update, Copyback, and Automatic Performance Adjustment Processing as Triggered by Loading of Second Drive FIG. 21 is an entire processing sequence for processing in the storage apparatus 10 according to the fifth embodiment. The detailed processing sequence from step S2101 to step S2104 is the same as that from step S1001 to step S1004 in FIG. 10, so its detailed explanation has been omitted and only its outline will be explained.

Firstly, if the second drive 520 is loaded into the storage apparatus 10 in place of the first drive 420E, the data controller 120 updates the microprogram/firmware group storage areas 423, 523 (step S2101). Next, the data controller 120 updates the microprogram to operate on the second drive 520 (step S2102).

Then, the data controller 120 updates the firmware 5211 to operate on the second drive 520 to the firmware of the latest revision in the storage apparatus 10 (step S2103). Next, the data controller 120 updates the firmware 4211 operating on each drive of all the first drives 420 mounted in the storage apparatus 10 to the firmware of the latest revision (step S2104).

Incidentally, in the process of the processing from step S2101 to step S2104, pre-update and post-update versions and revisions of the microprograms and the firmware in all the first drives 420, including the first drive 420E before replacement, and the second drive 520 are recorded in the drive management table 71 and the management tables 4231, 5231.

After the processing in step S2104 terminates, the data controller 120 checks whether a copyback can be executed or not, by, for example, displaying a statement reciting, for example, "Shall we execute a copyback?" on the display unit (not shown in the drawing) of the controller 100 (step S2105). Incidentally, checking of whether a copyback can be executed or not is not limited to direct inquiry to the user. For example, if there is a set value that is set by the user in advance, whether a copyback can be executed or not is judged based on that set value.

If it is determined in step S2105 that the copyback is to be executed (YES), processing in step S2106 is executed. If it is determined in step S2105 that the copyback is to be not executed, processing in step 2107 is executed.

In step S2106, the data controller 120 executes the copyback by writing data of the first drive 420E, which has been backed up in advance, to the second drive 520. The second drive 520 operates by using the firmware of the latest revision until the copyback is completed. The second drive 520 on which the copyback has been completed stores the data of the first drive 420E before being replaced and is loaded into the storage apparatus 10 in a state where the firmware is updated to the latest revision. Subsequently, processing in step S2107 is executed.

In step S2107, the automatic performance adjustment processing shown in FIG. 20 is executed. As a result, the firmware 5211 to operate on the second drive 520 is updated to firmware in conformity with the performance of another first drive 420 of the RAID group to which the second drive 520 belongs, that is, the RAID group to which the first drive 420E belonged before. Therefore, if the second drive 520 is a high-performance drive of a new type, the second drive 520 executes the processing, using the firmware of the latest revision which makes use of high performance until the execution of a copyback; and after the copyback, the second drive 520 executes the processing, using the low-performance firmware for which the performance difference between the second drive 520 and the first drives 420 in the RAID group has been adjusted.

With the above-described storage apparatus 10, the advantageous effect of improving a copyback processing speed and shortening restoration time at the time of the occurrence of a failure can be expected by executing the copyback on the second drive 520, using the firmware of the latest revision. Then, after the copyback, a balance with other first drives 420 in the same RAID group can be maintained by performing the automatic performance adjustment.

(6) Sixth Embodiment (6-1) Characteristic Configuration of Storage Apparatus According to this Embodiment The storage apparatus 10 according to a sixth embodiment is characterized in that if a certain condition is satisfied during the operation of the first drive 420, the firmware 4211 operating on the first drive 420 is automatically switched.

(6-2) Firmware Switching Processing as Triggered by Execution of Switching Judgment Program Activated During Normal Operation FIG. 22 is a processing sequence for processing executed by the storage apparatus 10 according to the sixth embodiment for automatically switching between firmware for energy saving (energy saving firmware) and firmware for normal use (normal firmware) based on load on LUs. With the storage apparatus 10 shown in FIG. 22, the energy saving firmware, for which the number of rotations of the drive is reduced to a certain number of rotations for an energy saving mode, and the normal firmware, for which the drive is operated at the normal number of rotations for a normal mode, are prepared; and if no input/output (I/O) is made for a certain period of time while the first drive 420 is in operation, the firmware operating on the relevant first drive 420 is updated to the energy saving firmware; and if the input/output (I/O) is then made, the firmware operating on the relevant first drive 420 is updated to the normal firmware.

The energy saving firmware and the normal firmware may be stored in, for example, the microprogram/firmware group storage area 423 of the first drive 420 or the microprogram/firmware group storage area 523 of the second drive 520. Furthermore, the energy saving firmware and the normal firmware may be stored in, for example, the shared memory 170 of the controller 100.

Before starting the processing sequence in FIG. 22, an automatic energy saving set value is stored as a parameter set in advance by the user or the like in, for example, the cache memory 160. The automatic energy saving set value is a value to which whether an automatic energy saving setting function that automatically switches to the energy saving firmware should be valid or not is set; and if the automatic energy saving setting function should not be valid; "1" is set; and if the automatic energy saving setting function should be valid; "2" is set.

Firstly, the data controller 120 activates a program for judging whether to switch to the energy saving firmware, after every specified period of time has elapsed (step S2201). The data controller 120 executes a series of processing shown in step S2202 and subsequent steps by the activation of this program.

In step S2202, the data controller 120 checks the automatic energy saving set value. If the automatic energy saving set value is "1" in step S2202, the firmware does not have to be switched and, therefore, the processing is terminated. If the automatic energy saving set value is "2" in step S2202, processing in step S2203 is executed.

In step S2203, the data controller 120 analyzes an I/O access status (access pattern) of each LU by recognizing an LU in a virtual storage area constituted from the plurality of first drives 420A to 420E as a unit.

Then, the data controller 120 calculates a load on all the LUs allocated to the relevant RAID group with respect to each RAID group based on the access pattern analysis result in step S2203 and judges whether the load is equal to or less than a specified threshold value or not (step S2204).

If the load is equal to or less than the specified threshold value in step S2204 (YES), this means a state where almost no access is made to the relevant RAID group and, therefore, the energy saving mode should be selected. When this happens, processing in step S2205 is executed.

If the load is more than the specified threshold value in step S2204 (NO), this means that access is made to the relevant RAID group and, therefore, the current state does not have to be changed to the energy saving mode. When this happens, processing in step S2207 is executed.

In step S2205, the data controller 120 judges whether the firmware 4211 in operation on the first drive 420 of the relevant RAID group is the energy saving firmware or not. If the energy saving firmware is being used (YES), the firmware 4211 does not have to be changed and the processing is terminated. If the energy saving firmware is not being used (NO), the firmware 4211 has to be changed to the energy saving mode and, therefore, processing in step S2206 is executed.

Then, in step S2206, the data controller 120 updates the firmware 4211 in operation to the energy saving firmware with respect to all the first drives 420 within the relevant RAID group. Subsequently, the processing is terminated.

On the other hand, in step S2207, the data controller 120 judges whether the firmware 4211 in operation on the first drive 420 of the relevant RAID group is the normal firmware or not. If the normal firmware is being used (YES), the firmware 4211 does not have to be changed and the processing is terminated. If the normal firmware is not being used (NO), the firmware 4211 has to be changed to the normal mode and, therefore, processing in step S2208 is executed.

Then, in step S2208, the data controller 120 updates the firmware 4211 in operation to the normal firmware with respect to all the first drives 420 within the relevant RAID group. Subsequently, the processing is terminated.

If no I/O is made for a certain period of time while the first drive 420 is in operation, the above-described storage apparatus 10 switches the firmware 4211 operating on the relevant first drive 420 to the firmware for the energy saving mode, so that wasteful power consumption in the relevant first drive 420 can be inhibited and an amount of heat generation can be reduced.

Furthermore, with the above-described storage apparatus 10, the processing from step S2202 to S2208 is executed every certain period of time. So, if the I/O occurs on the first drive 420 where the firmware for the energy saving mode operates, the firmware 4211 in operation can be switched to the firmware for the normal mode and, therefore, power saving and inhibition of the amount of heat generation can be realized as the need arises, while maintaining the processing ability of the normal first drive 420.

Incidentally, regarding the processing in FIG. 22, the energy saving firmware and the normal firmware are switched on a RAID group basis; however, for example, the firmware 4211 in operation can be switched for each drive by analyzing the access pattern of each drive as a target within the RAID group in step S2203 and calculating the load for each drive and comparing such load with the threshold value in step S2204. In such a case, a more efficient power saving measure and heat measure than switching of the firmware 4211 in operation on the RAID group basis can be realized.

Furthermore, the switching target may not be limited to each drive and switching can be controlled so that specified requirements are decided based on, for example, the performance of each drive and the firmware 4211 in operation is switched on one or more drives which satisfy the requirements.

Furthermore, if a sudden high load is detected during the operation of the energy saving firmware in the above-described storage apparatus 10, the data controller 120 may switch the firmware 4211 in operation to the normal firmware without waiting for a certain period of time to elapse.

Furthermore, with the above-described storage apparatus 10, the data controller 120 may monitor response speeds of all the LUs within the RAID group and judge whether or not responses are successfully returned within a specified period of time. As a result of this judgment, it is possible to judge whether or not the first drives 420 constituting the relevant RAID group have surplus capacity in terms of throughput. So, if responses are successfully returned within a specified period of time, the data controller 120 can realize the energy saving mode of better efficiency by changing the first drives 420 of the relevant RAID group to the energy saving firmware one by one.

Furthermore, with the above-described storage apparatus 10, the data controller 120 may analyze the load on all the LUs within the RAID group and switch the firmware based on the analysis result by having part of or all the first drives 420 within the RAID group operate the energy saving firmware. The above-described storage apparatus 10 can expect to have the efficient power saving effect in the RAID group.

Furthermore, the performance may be decided for each RAID group in advance, the number and type of drives that can be loaded may be limited for each RAID group, and a plurality of pieces of firmware may be prepared according to the performance as firmware to update the firmware 4211. The above-described storage apparatus 10 can realize minute energy saving measures according to performance groups.

Furthermore, the energy saving firmware may be a plurality of pieces of firmware, regarding which the number of rotations of the relevant drive is set in incremental steps, and may be firmware that operates by switching the number of rotations of the relevant drive between a low number of rotations and a high number of rotations. The above-described storage apparatus 10 can expect to have the efficient power saving effect within the RAID group where the firmware is switched.

(7) Other Embodiments

Incidentally, the storage apparatuses 10 according to the aforementioned first to sixth embodiments are examples of embodiments according to the present invention and the invention may be embodied by variations like those described below.

For example, with the storage apparatuses 10 according to the aforementioned first to sixth embodiments, the data controller 120 controls the microprograms and the firmware; however, the CPU 110 may control them. Furthermore, with the storage apparatuses 10 according to the aforementioned first to sixth embodiments, the first drive 420 stores only the microprogram and firmware for type A; however, the first drive 420 may be a storage device storing a microprogram and firmware that can be connected to different types of storage apparatuses, in the same manner as the second drive 520. Such a first drive 420 can be connected to different types of storage apparatuses in the same manner as the second drive 520, so that the user can use the first drive 420 and the second drive 520 without distinguishing one from another.

Furthermore, the configuration of the controller 100 is an example and the invention is not limited to this example. For example, FIG. 1 shows two controllers, the system-0 controller 100 and the system-1 controller 200; however, the number of controllers may be one or three or more. Furthermore, a storage apparatus of other than type A may be further provided. If the thus-provided storage apparatus is a storage apparatus of a type corresponding to that of the microprogram and firmware stored in the second drive 520, the second drive 520 can be loaded into either the storage apparatus 10 or the additionally provided storage apparatus. As a result, updates of the microprograms and firmware can be realized at the plurality of storage apparatuses by switching the storage apparatuses to which the second drive 520 is connected.

Furthermore, with the storage apparatuses 10 according to the aforementioned first to sixth embodiments, the first to third drive automatic update set values are set by considering the drive 420 or the drive 520 as one unit; however, the first to third drive automatic update set values may be set based on, for example, a drive type, a RAID group, or a loaded position of the relevant drive. In such a case, the storage apparatus 10 can update the programs on the above-mentioned element basis and thereby realize updates of the programs more flexibly.

Furthermore, with the storage apparatuses 10 according to the aforementioned first to sixth embodiments, the drive management table 71 shown in FIG. 3 is stored in the shared memory 170; however, the drive management table 71 may be stored in, for example, the local memory 150 or a ROM (Read Only Memory) (not shown in the drawing) or stored in one or more first drives 4220 in the disk unit 400. Furthermore, the microprogram/firmware group storage areas 423, 523 do not have to be individually independent storage areas and may be, for example, part of the user data storage areas 422, 522. Furthermore, the storage location of the microprogram/firmware group storage area 423 is not limited to inside the first drive 420 and may be, for example, the cache memory 160 or the shared memory 170 of the controller 100 or a storage device such as a semiconductor memory that can be externally connected. With the storage apparatus 10 for which the storage locations of various tables and programs can be changed as described above, the configuration to update a specified microprogram or firmware to be updated can be realized by, for example, storing the relevant program in the relevant storage device or memory and connecting it to the storage apparatus 10.

Furthermore, with the storage apparatuses 10 according to the aforementioned first to sixth embodiments, the management table 4231 stores information about the microprogram and firmware stored in the same drive 420 as the relevant management table 4231; however, the management table 4231 may store information about microprograms and firmware stored in all the first drives 420A to 420E in the disk unit 400. Such a management table 4231 has the information equivalent to that of the drive management table 71, so that the processing of the storage apparatus according to the aforementioned first to sixth embodiments can be realized by using either the management table 4231 or the drive management table 71.

Furthermore, with the storage apparatuses 10 according to the aforementioned first to sixth embodiments, the management table 4231 is stored in the microprogram/firmware group storage area 423 in the first drive 420; however, it may be stored in, for example, the cache memory 160 or the shared memory 170 on the controller 100 side. However, in that case, it is more efficient to manage the management table 4231 by integrating it into the drive management table 71 shown in FIG. 3.

Furthermore, with the storage apparatuses 10 according to the aforementioned first to sixth embodiments, the drive management table 71 and the management tables 4231, 5231 manage versions of the current microprograms and revisions of the current firmware as shown in FIGS. 3, 6, and 9; however, they may also manage versions of pre-update microprograms and revisions of pre-update firmware and further manage versions of the oldest microprograms and revisions of the oldest firmware, which are given as initial values at the shipment of products. In such a case, the data controller 120 can intentionally update the microprogram and firmware to programs of an old version or revision as long as the relevant microprogram and firmware remain in the storage area.

Incidentally, when replacing a drive in the storage apparatuses 10 according to the aforementioned second to the fifth embodiments, firmware to operate on a drive which has replaced the former drive may be switched and ON/OFF of the encryption may be changed. In such a case, the data controller 120 may execute additional processing for initializing data of the relevant drive as necessary. As a result, data which was stored in the relevant drive when the encryption function of the storage apparatus 10 was valid is prevented from entering a state where the data can be read after the encryption is cancelled. So, updates (including switching) of the firmware can be realized while ensuring security.

INDUSTRIAL APPLICABILITY

The present invention can be applied to a storage apparatus that manages RAID groups constituted from a plurality of storage devices and controls data with respect to the relevant RAID groups by operating microprograms and firmware.

REFERENCE SIGNS LIST

10 Storage apparatus
20, 20A to 20D LANs
30, 30A to 30D Host terminals
100, 200 Controllers
110, 210 CPU
120, 220 Data controllers
130, 130A, 130B, 230A, 230B Channel control units
140, 140A, 140B, 240A, 240B Disk control units
150, 250 Local memories
160, 260 Cache memories
170, 270 Shared memories
300, 300A to 300K Expanders
400 Disk unit
410 Unit disk unit
420, 420A to 420E First drives
421 Read/write control unit
4211 Firmware in operation
422 User data storage area
423 Microprogram/firmware group storage area
4231 Management table
4231A Microprogram column
4231B Firmware column
4232 Microprogram for A
4233 Firmware for A
520 Second drive
521 Read/write control unit
5211 Firmware in operation
522 User data storage area
523 Microprogram/firmware group storage area
5231 Management table
5231A, 5231C Microprogram columns
5231B, 5231D Firmware columns 5232 Microprogram for A
5233 Microprogram for B
5234 Firmware for A
5235 Firmware for B
600 Bus
71 Drive management table
71A RAID group
718 Position
71C Drive type
71D Firmware operation mode
71E Firmware revision
71F Logical unit
72 Performance group correspondence table
72A Drive type name
72B Performance group

The invention claimed is:

1. A storage apparatus comprising a disk unit composed of a plurality of first drives configured to store first firmware of a same type, a controller configured to control data during operation of the first firmware, a relay device configured to connect the controller and the disk unit, and a second drive configured to store a plurality of programs;
wherein the plurality of first drives are further configured to store a first microprogram corresponding to the first firmware capable of operating on the storage apparatus;
wherein the second drive is a drive that is newly mounted into the disk unit and configured to store second firmware of the same type as that of the first firmware and third firmware of a type different from that of the first firmware;
wherein the second drive is further configured to store a second microprogram of the same type as that of the first microprogram and a third microprogram of a type different from that of the first microprogram;
and wherein the controller includes:
a firmware comparison unit configured to compare the first firmware with the second firmware;
a firmware decision unit configured to decide firmware between the first firmware and the second firmware to operate on the storage apparatus based on the storage apparatus type and on the comparison result by the firmware comparison unit;
a firmware update unit configured to update the firmware operating on the first drive or the firmware operating on the second drive with the firmware decided by the firmware decision unit;
a microprogram comparison unit configured to compare the first microprogram with the second microprogram;
a microprogram decision unit configured to decide a microprogram between the first microprogram and the second microprogram to operate on the storage apparatus based on the comparison result by the microprogram comparison unit; and
a microprogram update unit configured to, based on settings made by a user,
not update,
update to a latest version of the decided microprogram, or
update to a latest subversion of a current version of the decided microprogram, the microprogram stored hi the first drive or the second drive.

2. The storage apparatus according to claim 1, wherein the firmware comparison unit executes the firmware comparison according to a first setting to determine whether the firmware can be updated or not; and
wherein the microprogram comparison unit executes the microprogram comparison according to a second setting to determine whether the microprogram can be updated or not.

3. The storage apparatus according to claim 1, wherein the firmware update unit updates the firmware operating on the first drive or the firmware operating on the second drive after the microprogram stored in the first drive or the second drive is updated by the microprogram update unit.

4. The storage apparatus according to claim 1, wherein the firmware comparison unit compares a revision of the first firmware with a revision of the second firmware.

5. The storage apparatus according to claim 1, wherein the microprogram comparison unit compares a version of the first microprogram with a version of the second microprogram.

6. The storage apparatus according to claim 1, wherein if the firmware decision unit decides to have the second firmware operate on the storage apparatus, the firmware update unit updates the first firmware, which is stored in the plurality of first drives, with the second firmware; and
If the firmware decision unit decides to have the second microprogram operate on the storage apparatus, the microprogram update unit updates the first microprogram, which is stored in the plurality of first drives, with the second microprogram.

7. The storage apparatus according to claim 1, wherein the first drive or the second drive stores fourth firmware that is of the same type as that of the first firmware and has a function different from that of the first firmware;
wherein the function may be an energy-saving function or a function for degrading performance of the drive; and
wherein the firmware decision unit decides firmware between the first firmware and the fourth firmware to operate on the storage apparatus according to a specified state of the storage apparatus, wherein the specified state may include performance or access count.

8. The storage apparatus according to claim 1, wherein the firmware comparison unit compares the first firmware with the second firmware as triggered by loading of the second drive into the storage apparatus.

9. The storage apparatus according to claim 1, wherein the firmware comparison unit compares the first firmware with the second firmware as triggered by a specified command to the storage apparatus.

10. The storage apparatus according to claim 1, wherein the firmware comparison unit compares the first firmware with the second firmware according to a specified command from a host terminal outside the storage apparatus.

11. A program update method for a storage apparatus comprising a disk unit composed of a plurality of first drives storing first firmware of the same type, a controller for controlling data during operation of the first firmware, a relay device connecting the controller and the disk unit, and a second drive storing a plurality of programs,
wherein the plurality of first drives store a first microprogram capable of operating on the storage apparatus corresponding to the first firmware;
wherein the second drive is newly mounted into the disk unit and stores second firmware of the same type as that of the first firmware and third firmware of a type different from that of the first firmware;
wherein the second drive further stores a second microprogram of the same type as that of the first microprogram and a third microprogram of a type different from that of the first microprogram; and
wherein the controller:
compares the first firmware with the second firmware;

decides firmware between the first firmware and the second firmware to operate on the storage apparatus based on the storage apparatus type and on the firmware comparison result;

updates the firmware operating on the first drive or the firmware operating on the second drive with the decided firmware;

compares the first microprogram with the second microprogram;

decides a microprogram between the first microprogram and the second microprogram to operate on the storage apparatus based on the comparison result; and executes, based on settings made by a user,
- no update,
- an update to a latest version of the decided microprogram, or
- an update to a latest subversion of a current version of the decided microprogram, to the microprogram stored in the first drive or the second drive.

12. The program update method according to claim 11, wherein the first drive further stores a first microprogram capable of operating on the storage apparatus corresponding to the first firmware;

wherein the second drive further stores a second microprogram of the same type as that of the first microprogram and a third microprogram of a type different from that of the first microprogram; and wherein the controller:

compares the first microprogram with the second microprogram; decides a microprogram between the first microprogram and the second microprogram to operate on the storage apparatus based on the microprogram comparison result; and updates the microprogram stored in the first drive or the second drive with the decided microprogram.

13. The program update method according to claim 12, wherein the firmware comparison is executed according to a first setting to determine whether the firmware can be updated or not; and wherein the microprogram comparison is executed according to a second setting to determine whether the microprogram can be updated or not.

14. The program update method according to claim 12, wherein the firmware operating on the first drive or the firmware operating on the second drive is updated by the firmware to operate on the storage apparatus after the microprogram stored in the first drive or the second drive is updated by the microprogram to operate on the storage apparatus.

* * * * *